US009544752B2

United States Patent
Rege et al.

(10) Patent No.: US 9,544,752 B2
(45) Date of Patent: Jan. 10, 2017

(54) MOBILE ACTIVITY INTELLIGENCE

(71) Applicant: MOBILE IRON, INC., Mountain View, CA (US)

(72) Inventors: Ojas Udayan Rege, Palo Alto, CA (US); Robert Bates Tinker, San Francisco, CA (US); Sanjeev Kumar Mishra, San Jose, CA (US); Sandilya Garimella, San Jose, CA (US); Stuart Carleton Eichert, Mountain View, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

(21) Appl. No.: 14/690,310

(22) Filed: Apr. 17, 2015

(65) Prior Publication Data

US 2015/0223044 A1    Aug. 6, 2015

Related U.S. Application Data

(63) Continuation of application No. 13/679,902, filed on Nov. 16, 2012, now Pat. No. 9,042,862, which is a continuation of application No. 12/421,517, filed on Apr. 9, 2009, now Pat. No. 8,340,633.

(51) Int. Cl.
| | |
|---|---|
| *H04W 4/26* | (2009.01) |
| *H04L 12/14* | (2006.01) |
| *H04M 15/28* | (2006.01) |
| *H04M 15/00* | (2006.01) |
| *H04W 4/24* | (2009.01) |

(52) U.S. Cl.
CPC ............ *H04W 4/26* (2013.01); *H04L 12/1403* (2013.01); *H04L 12/1428* (2013.01); *H04M 15/28* (2013.01); *H04M 15/31* (2013.01); *H04M 15/44* (2013.01); *H04M 15/58* (2013.01); *H04M 15/61* (2013.01); *H04W 4/24* (2013.01)

(58) Field of Classification Search
CPC .......... H04W 4/26; H04W 4/24; H04M 15/31; H04M 15/44; H04M 15/28; H04M 15/58; H04M 15/61; H04L 12/1428
USPC ........................ 455/403, 405, 406, 407, 408, 414.1,455/550.1; 709/217, 218, 219
See application file for complete search history.

(56) References Cited

U.S. PATENT DOCUMENTS

2008/0147684 A1* 6/2008 Sadovsky ............... G06Q 10/10
2008/0177858 A1* 7/2008 Aarnio .................... H04L 67/20
709/217

* cited by examiner

*Primary Examiner* — Cong Tran
(74) *Attorney, Agent, or Firm* — Van Pelt, Yi & James LLP

(57) ABSTRACT

In various embodiments, a method is described that includes receiving mobile device usage data directly from each of a plurality of mobile devices associated with a particular enterprise, aggregating the usage data from each of the plurality of mobile devices at a central database, and generating one or more mobile device usage reports based on the aggregated usage data.

20 Claims, 32 Drawing Sheets

CURRENT ROAMERS

| Current Roamer | Since | Roaming Country | Min Used | MB Used | Home Carrier | Alert sent |
|---|---|---|---|---|---|---|
| Maya | Oct 28, 2008 | UK | 20 | 0 | AT&T | No |
| Priya | Oct 28, 2008 | France | 200 | 4 | Orange | No |
| Aditi | Oct 28, 2008 | India | 10 | 10 | Globe | Yes |
| Shanti | Oct 28, 2008 | Brazil | 50 | 15 | T-Mobile | No |
| Indira | Oct 28, 2008 | China | 100 | 20 | AT&T | Yes |
| Nisha | Oct 27, 2008 | Mexico | 120 | 8 | AT&T | No |
| Amit | Oct 25, 2008 | Egypt | 300 | 20 | Vodafone | Yes |
| Bhanu | Oct 25, 2008 | | 400 | 10 | AT&T | Yes |
| Ravi | Oct 21, 2008 | | 500 | 30 | AT&T | Yes |

Get info travelers on short term roaming plans as soon as they start roaming

| Time | User | Phone number | Carrier | Minutes | Avg. signal strength (%) | Start cell id | End cell id |
|---|---|---|---|---|---|---|---|
| 2009-03-13 03:48 | Ojas Rege | 16505556677 | AT&T | 0 | 88 | 4305 | 4305 |
| 2009-03-13 03:32 | Ojas Rege | 16505556677 | AT&T | 0 | 88 | 4305 | 4305 |
| 2009-03-13 03:30 | Ojas Rege | 16505556677 | AT&T | 19 | 88 | 4305 | 257 |

MOBILE ACTIVITY INTELLIGENCE

CROSS REFERENCE TO OTHER APPLICATIONS

This application is a continuation of co-pending U.S. patent application Ser. No. 13/679,902, entitled MOBILE ACTIVITY INTELLIGENCE filed Nov. 16, 2012 which is incorporated herein by reference for all purposes, which is a continuation of U.S. patent application Ser. No. 12/421,517, now U.S. Pat. No. 8,340,633, entitled MOBILE ACTIVITY INTELLIGENCE filed Apr. 9, 2009 which is incorporated herein by reference for all purposes.

TECHNICAL FIELD

This disclosure relates generally to mobile devices and management systems and, more particularly, to gathering data directly from mobile devices for use in mobile device management.

BACKGROUND OF THE INVENTION

In a manner similar to personal computers and laptops, business enterprises increasingly rely on mobile and handheld devices. Indeed, the capabilities and uses of mobile devices have moved beyond voice communications and personal information management applications to a variety of communications- and business-related functions including email, browsing, instant messaging, enterprise applications, and video applications. For example, the functionality of many mobile devices have been extended to include cellular and wireless local area network (WLAN) communications interfaces, as well as virtual private network (VPN) and other client applications. Furthermore, mobile devices used in enterprises may also include enterprise applications used by employees in the field or otherwise.

Deployment, management and configuration of mobile and handheld devices in enterprise environments, however, present certain challenges. For example, the vast and constantly changing variety of mobile device types, functions and capabilities presents challenges to configuration, provisioning and troubleshooting. Moreover, enterprise mobile expenses are one of the fastest growing enterprise expenditures, and as such, enterprises are paying more attention to their bills from network service providers.

BRIEF DESCRIPTION OF THE DRAWINGS

Various embodiments of the invention are disclosed in the following detailed description and the accompanying drawings.

FIGS. 11A-11D illustrate example international usage reports.

FIG. 13 illustrates an example control center interface.

FIG. 14C illustrates an example call log.

DETAILED DESCRIPTION

Figure 1A:
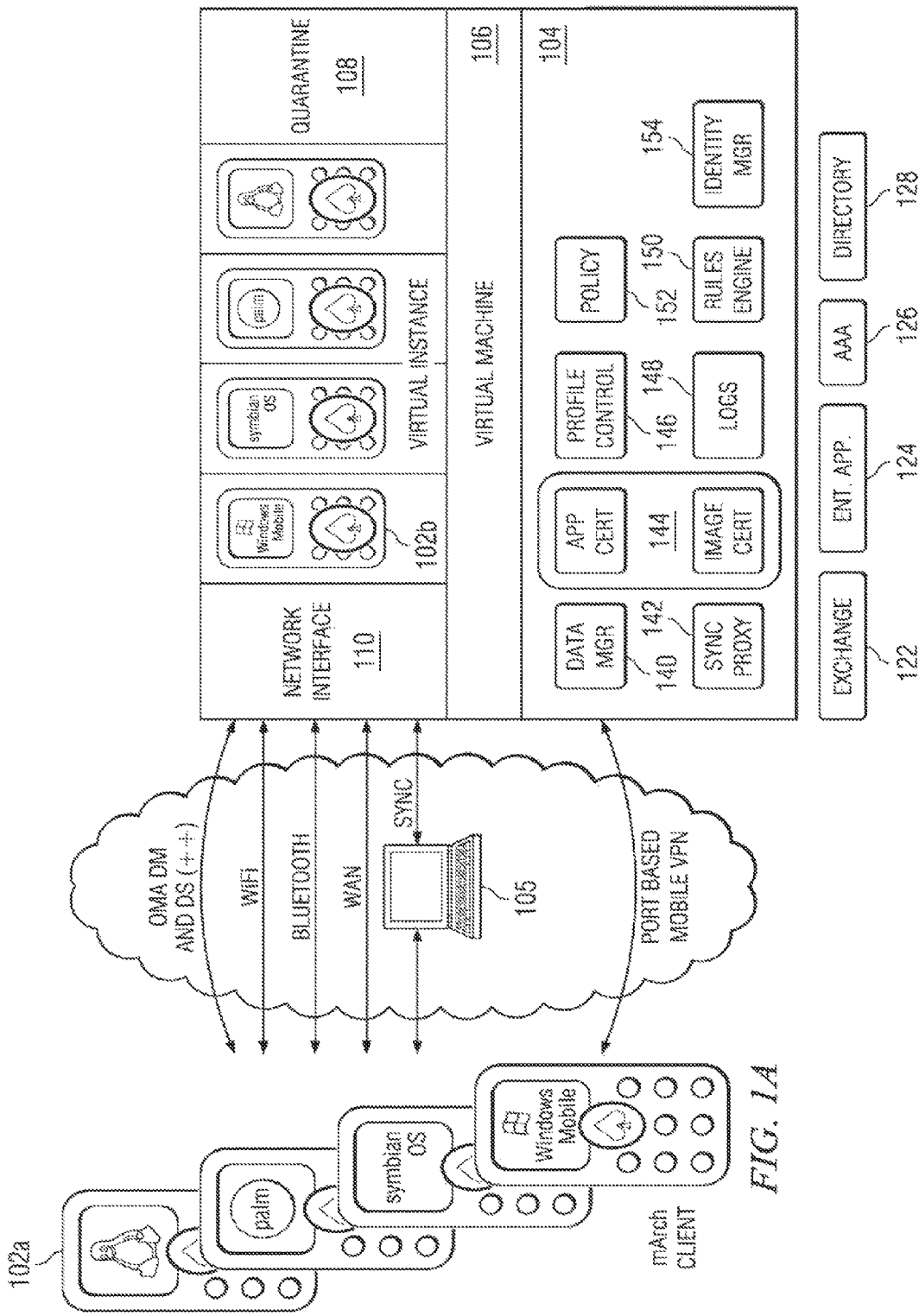
FIGS. 1A to 1D are schematic diagrams illustrating an example mobile device management architecture according to an embodiment of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of the present disclosure provide methods, apparatuses and systems directed to the collection of a wide variety of data from a variety of mobile devices, which, in turn, may be used in facilitating deployment, configuration, and/or management of the mobile devices. In particular embodiments, a central mobile activity intelligence provider may receive any and all data directly, and potentially in real-time, from the mobile devices (e.g., phones) associated with a given enterprise, filter, analyze, and otherwise process the data, and provide customized reports to the enterprise thereby allowing the enterprise to have a better information balance between what the enterprise knows and what its network service provider(s) know. By way of example, in particular embodiments, key reports may include voice summary reports, carrier summary reports, international roaming reports, dropped call reports, and home zone reports, among others, as will be described in further detail below. Such knowledge may enable the enterprise to significantly reduce its costs by utilizing this knowledge to monitor cost drivers, negotiate with network service providers for better rates and to optimize its service plans as well as to verify quality of service (QoS) or compliance and enforce a service level agreement (SLA). Furthermore, this raw and/or processed data may be stored in a central database and compared with other related data over time to gauge the effectiveness of the enterprise's current mobile deployment. Moreover, such aggregated data may be stripped of most or all individual and/or enterprise identifying data and further aggregated with that of other enterprises in a central data repository. In this way, a central mobile activity intelligence service provider may provide multi-enterprise multi-carrier reports that include aggregated data from a plurality of enterprises and network service providers and provide valuable insight to each of the enterprises.

In a particular embodiment, for each of one or more mobile devices, a mobile device management application, maintains a virtual instance of the mobile device, and interacts with a control client application hosted on the physical instance of the mobile device to synchronize the state of the physical instance of the mobile device with the virtual instance of that mobile device. In one particular embodiment, the control client logs man-machine interface (MMI) data, file system commands, and other data characterizing usage of, and/or the actions performed on, the mobile device. Some or all of the log data is provided to a device management application hosted on a device management server, which can synchronize the state of the virtual instance of the mobile device. In this manner, the device management application provides an administrator a snapshot of the state of the mobile device, and facilitates device management operations, as described below.

Virtual Instance Architecture for Mobile Device Management Systems

In particular embodiments, a virtual instance of a mobile (wireless capable) device is a running instantiation of the associated actual physical mobile device (hereinafter also referred to as "physical instance") that can execute or operate in a virtualized execution environment. For example, a server may host a virtual machine that emulates the hardware (such as the microprocessor or controller) of the mobile device, allowing a copy of the mobile device operating system (hereinafter also referred to as "virtual operating system") to be run. Additionally, one or more applications (themselves or copies) installed on the actual mobile device can also run on the virtual operating system. The virtual instance of the mobile device may also include all or a subset of the file system image of the mobile device, as well as device configuration and settings. In one embodiment, the logged usage data transmitted from a control client application on the actual mobile device can be used to replay, using the virtual instance of the mobile device, the actions taken by a user on the actual mobile device for a desired period of time. Still further, a device management server, in some implementations, may support an interface that presents a rendered image of the mobile device and activatable man-machine interface that allows a user to input commands to, and otherwise interact with, the actual mobile device or the virtual instance of the mobile device.

In one embodiment, there is a one-to-one correspondence between a virtual instance and a physical instance of a mobile device. The virtual instance of the mobile device includes a hardware emulation layer and a software emulation layer. The hardware and software emulation layers emulate the hardware and software components of the physical instance of the mobile device, respectively. Both the hardware and software emulation layers are executable in a computer runtime environment and, generally, the software emulation layer is executable within the context of the hardware emulation layer to replicate the behavior, operations, and/or characteristics of identical software being executed on the actual physical mobile device. In a particular embodiment, a mobile device management application on a device management server executes the hardware and/or software emulation layers of a virtual instance of a mobile device in connection with remote management of the physical instance of the mobile device.

Figure 1B:
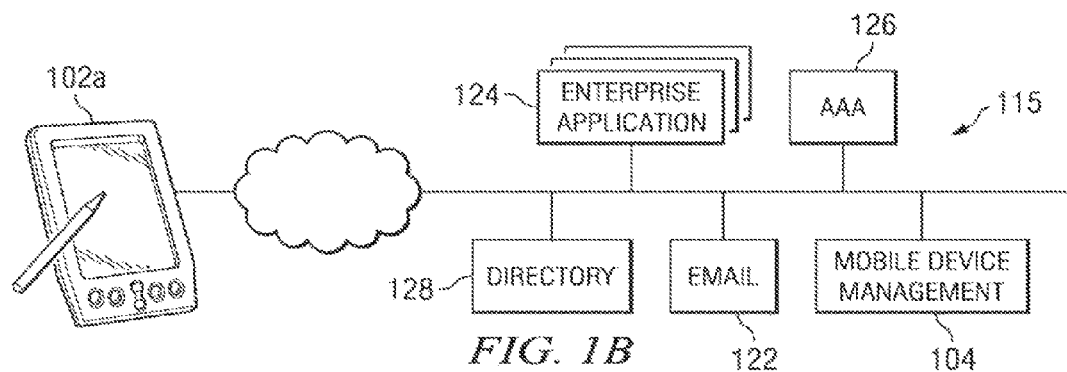

FIGS. 1A and 1B are schematic diagrams illustrating the interaction between a physical instance of a mobile device 102a and a device management server 104 operative to maintain a virtual instance of the mobile device 102b. As FIG. 1A illustrates, a physical instance of a mobile device 102a may communicate with device management server 104 over a variety of communication channels and networks, such as WLAN/WiFi, BlueTooth, Wide Area Networks (WANs), and/or indirectly via a personal computer 105 during, by way of example, synchronization. As FIG. 1B illustrates, device management server 104 may be operably connected to an enterprise network 115. Enterprise network 115 may further include one or more of email or exchange servers 122, enterprise application servers 124, authentication (AAA) servers 126, directory servers 128, Virtual Private Network (VPN) gateways, firewalls, among other servers and components. A number of mobile devices 102a may access or utilize one or more of the enterprise systems or functionality described above.

Figure 1C:
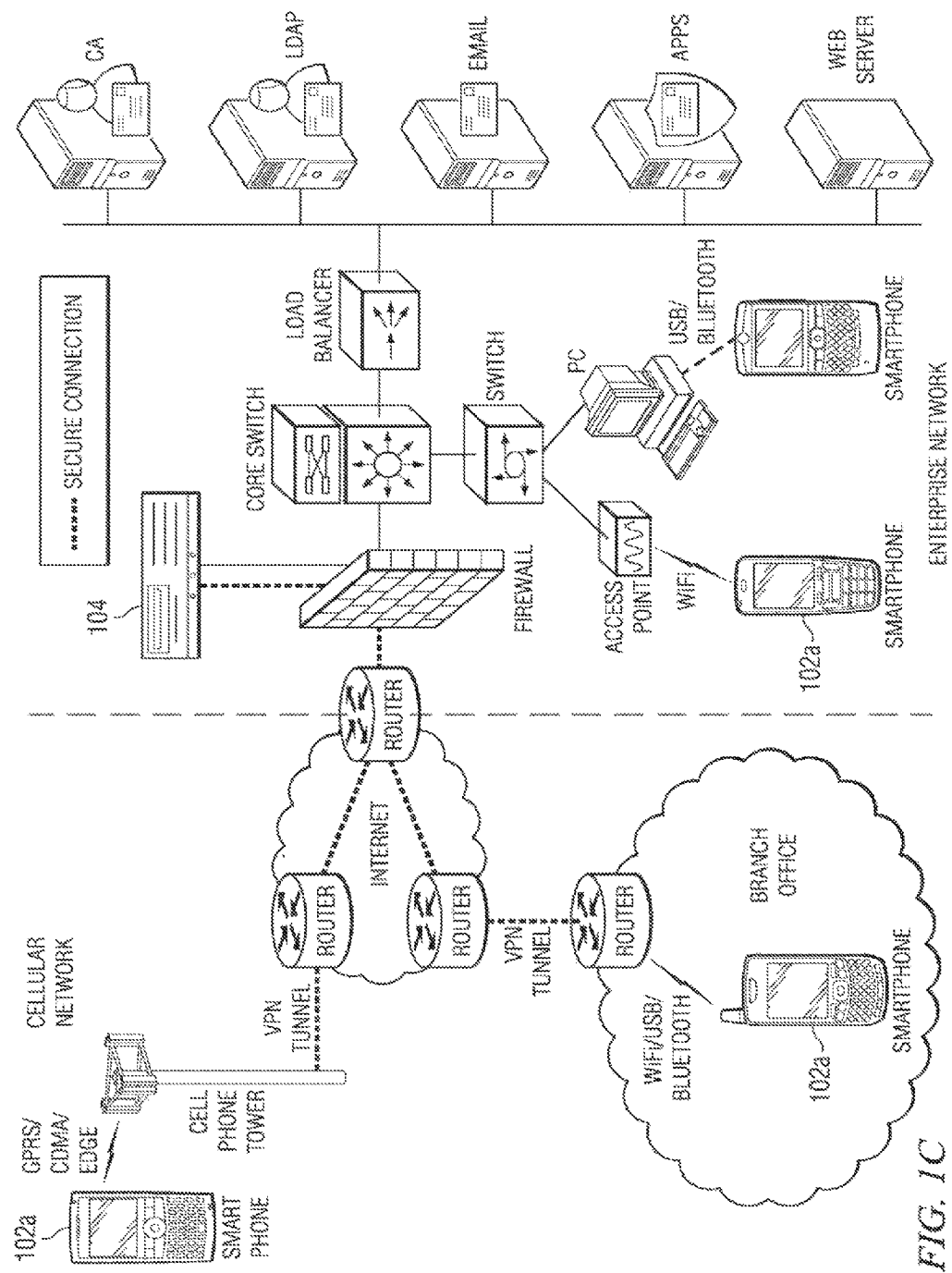
Figure 1D:
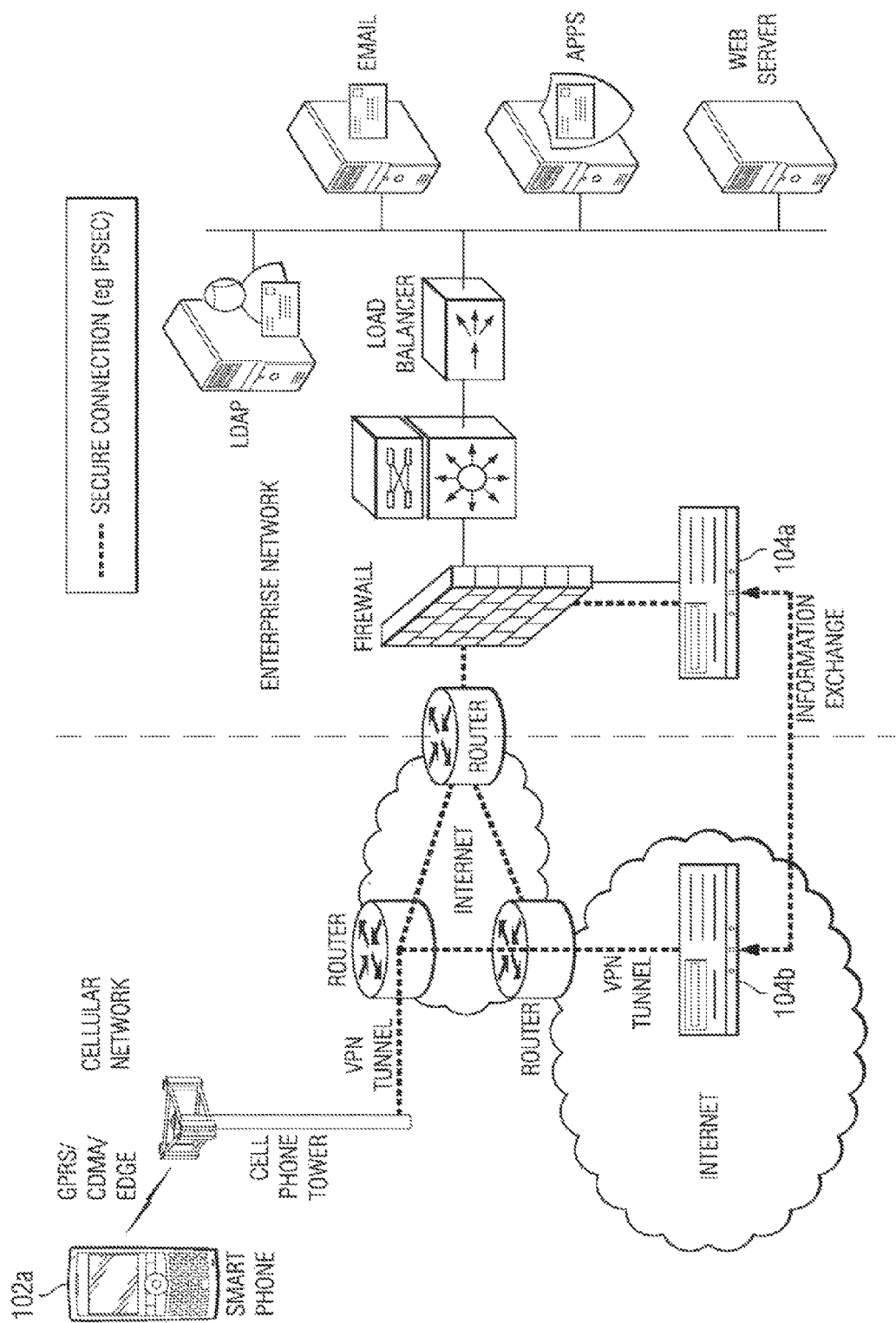

FIGS. 1C and 1D illustrate other example deployment architectures. In various embodiments, device management server 104 can be installed in a variety of locations such as, by way of example, within a data center, a de-militarized zone (DMZ, i.e., a computer or small subnetwork that lies between a trusted internal network, such as a corporate private LAN, and an untrusted external network, such as the public Internet), topologically in-front of enterprise application servers, as well as in the cloud (i.e., a public or semi-public space that exists between the end points of a transmission depending on the requirements of the network administrator). FIG. 1C illustrates an example deployment of device management server 104 in a DMZ. As shown in FIG. 1C, device management server 104 may reside in the enterprise DMZ and may act as a proxy device for some or all data traffic coming from the physical instances 102a of the mobile devices connecting through external networks including cellular networks such as, by way of example, GSM (e.g., 2G), GPRS (e.g., 2.5G or 3G), UMTS (e.g., 3G), or EDGE networks, as well as other wireless networks (e.g., WiFi).

In particular embodiments, all the data traffic that comes from the physical instances 102a of the mobile phones will first be received by device management server 104 before being sent to the respective final destinations. In one particular embodiment, to direct all traffic from the physical instances 102a of the mobile devices to device management server 104, an IPSEC tunnel may be used that terminates at device management server 104. In various embodiments, there may be at least two modes of operation here—split-tunneling and full tunneling. In split tunneling mode, all traffic that is destined to the enterprise network will come through the IPSEC tunnel and any other traffic that is destined to, for example, the internet will go directly to the internet through the operator's network. In full tunneling mode, all traffic irrespective of its destination (e.g., internet traffic or enterprise network traffic) will first come to device management server 104 before being transmitted out. In some embodiments, when in full tunneling mode, device management server 104 may offer more comprehensive security and controls to the administrators as all traffic passes through the device management server 104, giving administrators full control of the traffic going in and out of the physical instance 102a of any mobile device.

FIG. 1D illustrates an example Software as a Service (SaaS) deployment architecture. In particular embodiments, a device management server 104b resides in a remote network relative to the enterprise, and can be remotely managed by enterprise administrators. This sort of model may be well-suited for enterprises that have more SaaS-based applications where the data traffic usually does not come to the enterprise network. Rather, clients are directly served from the servers within the internet. In such a case, a deployment architecture where network traffic is first received within the enterprise network over IPSec Tunnels, and is then sent to the internet to host applications may be inefficient as it adds another hop to the network. However, an SaaS deployment architecture is well-suited for enterprises that include a relatively fewer number of devices and perhaps, furthermore, cannot afford to manage them exclusively in the enterprise network.

In an example SaaS model embodiment, the solution can be implemented as a single box operable such that an administrator may log into a portal available to him to manage mobile devices, or, in an alternate embodiment, deployed in conjunction with another device management server 104a within the enterprise network. In such an example two-box solution, enterprise device management server 104a may protect the traffic entering the enterprise, while device management server 104b in the internet protects the traffic going directly to the Internet from the mobile client. In this scenario, two IPSec tunnels may be deployed for a given mobile device 102a to protect the traffic between the mobile client in the mobile device 102a and the internet and enterprise networks. Any traffic that is destined to the enterprise will use the enterprise IPSEC tunnel and all other traffic will use the other IPSEC tunnel. In such a case, both device management servers 104a and 104b may communicate with one another to accomplish various functions or tasks. If, for some reason, the device management server 104b in the hosted cloud sees some abnormal behavior (e.g., a virus or something similar) on a particular mobile client, it may immediately inform the device management server 104a in the enterprise to implement a policy to block the traffic coming from that particular mobile client.

Each device management server 104 may include, or operate in connection with, one or more of a data manager 140, a synchronization proxy 142, an application/image certification module 144, a profile control module 146, a log module 148, a rules engine 150, a policy module 152 and an identity manager 154. Device management servers 104 may also operate in connection with one or more virtual instances 102b of respective mobile devices. In one implementation, device management servers 104 comprise one or more virtual machines 106, as may be required to emulate the hardware of different mobile device types. Each virtual instance 102b of a mobile device is a virtualized instance that is configured based on the configuration details and other attributes of the physical instance 102a of that particular mobile device. For example, the virtual operating system that runs on the virtual machine 106 is selected to be the same version as that installed on the physical instance 102a of the mobile device. In addition, device management servers 104 may maintain a virtual image of a data storage device(s) installed on the physical instance 102b of the mobile device.

A virtual instance 102b of a mobile device may comprise information relating to 1) one or more applications installed on the mobile device, 2) an operating system, 3) a microprocessor, controller, and/or other hardware or firmware functionality of the mobile device, and 4) an image of one or more storage devices installed in the mobile device (such as a disk or flash/ROM image) including executable as well as non-executable files and data stored on a storage device of the mobile device. A storage device or file system image may comprise a computer file containing the complete contents and structure of a data storage medium or device, such as a hard drive, flash drive, etc. An image generally contains all the information necessary to replicate the structure and contents layout, as well as the actual contents, of a storage device. Device management servers 104 may maintain this image information in a data store and load a particular virtual instance 102b into the virtual execution environment as needed or, for example, in response to a command from an administrator.

As described above, the virtual instance 102b of a particular mobile device is a running instance of the mobile device that may execute in a virtual machine runtime environment. For example, the virtual machine runtime environment may emulate the hardware processor installed in the mobile device relative to the operating system. In a particular embodiment, the virtual machine fully simulates the complete hardware of the mobile device, allowing an unmodified operating system to run in connection with the virtual machine. In other embodiments, the virtual machine may require some modification to the operating system. In particular embodiments, the virtual machine 106 may be implemented using a Type 1 or Type 2 hypervisor. A Type 1 hypervisor runs directly on the hardware while a Type 2 hypervisor runs on another operating system, such as Linux. Each virtual machine may run any operating system supported by the underlying hardware. Device management server 104 may thus run two or more different "guest" virtual instances 102b of respective mobile devices simultaneously, in separate "private" virtual computers. In some embodiments, device management server 104 may operate in connection with multiple virtual machine types, as required for management of different mobile device platforms.

Device management server 104 may also include one or more network interfaces 110 for communication with remote hosts, such as the physical instances 102a of mobile devices, as well as enterprise applications and others. In some embodiments, the virtual instances 102b of the mobile devices may communicate with remote hosts through the one or more network interfaces 110. Device management server 104 may further support a holding or quarantine section 108, which is a conceptual area into which virtual instances 102b of mobile devices may be placed. By way of example, in some embodiments, physical instances 102a of mobile devices that have become infected with a virus may have their corresponding virtual instances 102b placed in quarantine section 108. In addition, new virtual instances 102b that have not been fully defined relative to the corresponding physical mobile device instances 102a may also be placed in the quarantine section 108 until the full virtual instances have been defined. Placement of a virtual instance 102b of a mobile device in quarantine section 108 may affect policy or configuration changes on the enterprise's network. For example, access to the enterprise network allowed to a physical instance 102a of a mobile device, while the virtual instance 102b is in quarantine section 108 may be restricted to data connections to device management server 104 in order to receive required configuration updates or patches, or to allow the device management server to discover one or more attributes of the physical instance 102a in order to fully define the virtual instance.

A control client application 302 hosted on a particular physical mobile device may monitor operation of the mobile device and interact with remote device management application server 104 to allow the mobile device management application server to synchronize the state of the physical and virtual instances 102a and 102b, respectively, of the mobile device. For example, in particular embodiments, the control client application 302 may include layers or hooks inserted into one or more communications or device protocol stacks to monitor and/or log data entered into or transmitted from the mobile device. More specifically, the control client application 302 may log the key strokes entered using a dial pad, keyboard, and/or pointing device. The control client application 302 may also monitor and log file system operations. In addition, the control client application 302 may monitor and log data transmitted to or from a communications interface, such as a cellular network interface, a wireless local area network interface, among others.

Figure 2:
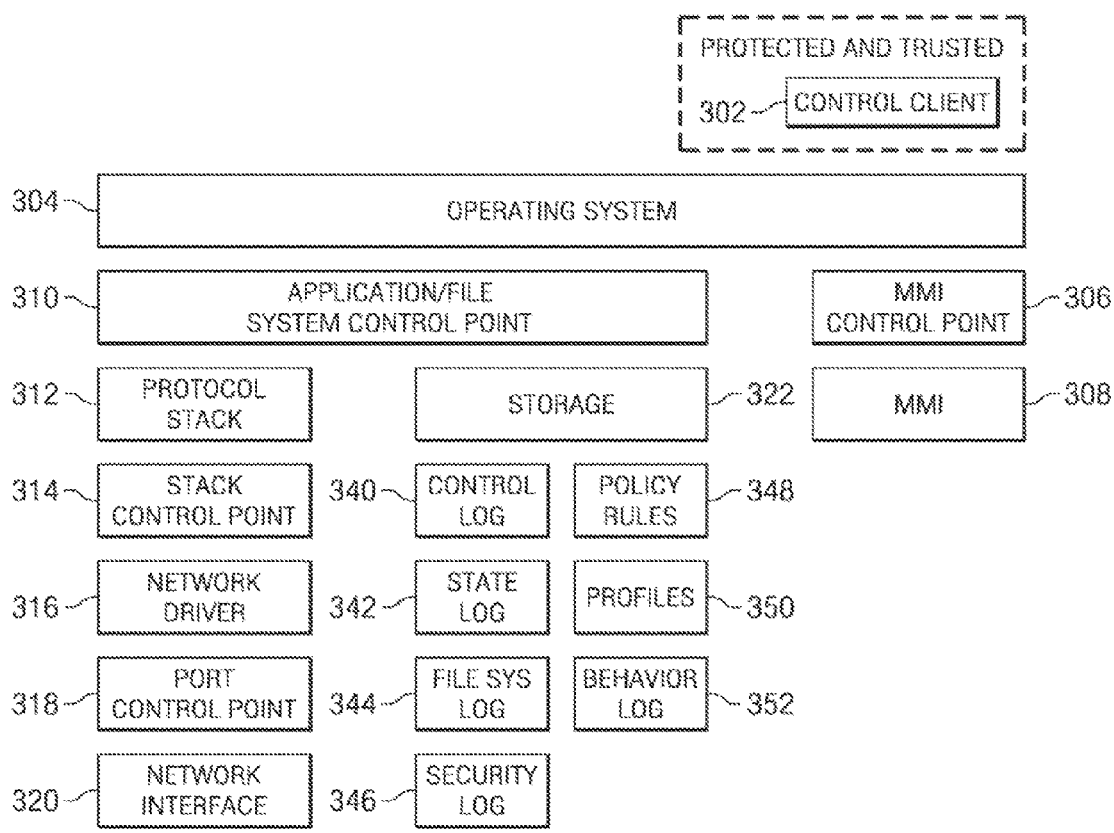
FIG. 2 provides an example schematic, functional representation of how a control client may be integrated into a mobile device according to an embodiment of the present disclosure.

FIG. 2 illustrates how control client functionality may be integrated with a physical instance 102a of a mobile device. In particular embodiments, the control client functionality may include a control client application 302 and one or more control points inserted to monitor data traversing the interfaces of the physical instance 102a of the mobile device. For example, a man-machine interface (MMI) control point 306 may be inserted into the driver stack of the man-machine interface 308 to log keystroke data. An application/file system control point 310 may be inserted to monitor and log application level and file system commands. Additionally, stack control point 314 may be inserted in one or more network protocol stacks of the physical instance 102a of the mobile device, while port control points 318 may be inserted at a different layer of the network protocol stack. In various embodiments, one or more of the control points may be implemented as drivers that are installed in the appropriate driver stacks of the mobile device. In some implementations, the control points may emulate the operation of higher layer and/or lower layer drivers and pass data on to the lower or higher layer native drivers. In some embodiments, a rule set may define what data is captured.

Control client application 302 may store the data collected by the control points in one or more log files stored on a storage device of the mobile device. For example, control client application 302 may store file system commands (such as open, save, delete, copy, rename, etc.) in file system log 344. Furthermore, control client application 302 may store keystroke data in behavior log 352. Still further, control client application 302 may store data relating to its own operation in control log 340.

The control client application 302 can provide some of all of the data to device management server 104, which may synchronize the state of the virtual instance 102b of the mobile device with the physical instance 102a based on the data provided to it. In this manner, a central device management server 104 can, for example, maintain an accurate image of the data storage device(s) of the mobile device, including the applications installed and the files stored on the mobile device. In various embodiments, control client application 302 may operate to provide this data in real-time, intermittently during periods of non-activity (e.g., such as when the mobile device is inserted into a charging cradle), in addition to, or at, periodic intervals. Still further, the data may be provided to the device management server 104 during a synchronization operation between the mobile device and the user's personal computer. In a particular embodiment, a synchronization utility hosted by the user's personal computer may be configured to transmit the data to the device management server 104. In addition, the control client application 302 may operate in one to a plurality of modes based on a set of rules or policies. Furthermore, the control client application 302 may also apply a rule set that determines what data is provided to the device management server 104, and/or when such data is transmitted.

In particular embodiments, the control client application 302 and the remote management server 104 may establish encrypted connections. For example, Virtual Private Network (VPN) tunneling and encryption may be used to secure the connection. In a particular implementation, the physical instance 102a of a mobile device may include port-based VPN functionality to encrypt the connection between the control client application 302 and the remote management server.

In various embodiments, the physical instances 102a of the mobile devices may include device management and/or data synchronization functionality. For example, the physical instances 102a of the mobile devices may support the Open Mobile Alliance (OMA) Device Management (DM) protocol, and/or the OMA Data Synchronization (DS) protocol. OMA DM is a protocol specified by OMA for DM purposes, by the Device Management Working Group and the Data Synchronization Working Group. One such specification is OMA DM version 1.2, which is incorporated by reference herein. The OMA DM specification is designed for management of small mobile devices such as, by way of example, mobile phones, mobile smart phones, PDAs and palm top computers. The device management may support 1) provisioning (configuration of the device (including first time use), enabling and disabling features); 2) configuration (allowing changes to settings and parameters of the device); 3) software upgrades (providing for new software and/or bug fixes to be loaded on the device, including applications and system software); and 4) fault management (such as reporting errors from the device, querying about status of device). The device management generally takes place by communication between a server (which is managing the device) and the client (the device being managed). OMA DM is designed to support and utilize any number of data transports such as a) physically over both wireline (e.g., USB, RS-232) and wireless media (e.g., GSM, CDMA, Infrared, BlueTooth), and b) transport layers implemented over any of WSP (WAP), HTTP or OBEX or similar transports. The communication protocol is generally a request-response protocol. Authentication and challenge of authentication may be incorporated to ensure the server and client are communicating after proper validation. The communication may be initiated by the OMA DM server, asynchronously, using any of a variety of methods available such as, by way of example, a WAP Push or SMS. Once the communication is established between the server and client, a sequence of messages may be exchanged to complete a given device management task. OMA DM provides for alerts, which are messages that may occur out of sequence, and may be initiated by either server or client. Such alerts may be used to handle errors, abnormal terminations, etc.

Several parameters relating to the communication such as, for example, the maximum message size, may be negotiated between the server and client during the initiation of a session. In order to transfer large objects, the protocol allows for sending larger objects in smaller portions or chunks. Error recovery based on timeouts is not specified completely, hence, different implementations may possibly differ as the protocol is not fully specified in these areas. The protocol specifies exchange of packages during a session, each package consisting of several messages and each message, in turn, consisting of one or more commands. The server generally initiates the commands and the client is expected to execute the commands and return the result(s) via a reply message. Particular embodiments may also use the OMA Data Synchronization (DS) protocols and functionality for synchronization of files and data between the physical and virtual instances 102a and 102b of a particular mobile device.

Using OMA DM or another suitable protocol, the control client functionality discussed above can be installed on a physical instance 102a of a mobile device. For example, a mobile device without the control client functionality can be provisioned and configured as follows. In a preliminary step, an administrator may create a virtual instance 102b of a mobile device with a minimal configuration. The virtual instance 102b, prior to full configuration, may be quarantined in quarantine 108—a state in which the corresponding physical instance 102a of the mobile device is not allowed access (or at least full access) to the enterprise's internal network, except for device registration and provisioning with the device management server 104. Suitable identifying information may include a device identifier, a user name, and the like. A user of the mobile device may then be directed to connect to the device management server 104 using, for example, a dial up connection, or a data connection with a WAP browser. The device management server 104, acting as an OMA DM server, may then interrogate the mobile device to learn one or more attributes (such as model number, serial number, operating system type and version, etc.), and provision and configure the mobile device. When the physical instance 102a of the mobile device has been configured, the device management server 104 may further use the configuration and other information related to the mobile device to complete the virtual instance 102b of the mobile device and remove it from quarantine.

The device management server 104 may also include other functionality, such as image and/or application software installation, upgrade and/or repair for one or more mobile devices, as well as other functionality. In one embodiment, an administrator may select one or more virtual instances 102b of respective mobile devices, and cause device management server 104 to transmit updated software applications, patches, and the like to the corresponding physical instances 102a of the mobile devices. During installation of software to a particular mobile device, the control client application 302 may communicate the log data reflecting the changes to device management server 104, which results in changes to the virtual instance 102b of the mobile device. In another embodiment, the administrator may change one or more attributes of the virtual instance 102b of the mobile device, which causes the device management server 104 to transmit commands to the corresponding physical instance 102a of the mobile device to cause it to implement the changes made to the virtual instance of the mobile device.

The physical and virtual instances 102a and 102b of the mobile device, through the control client 302, device management server 104, and the protocols described herein, may effect state changes, policy and other device management rules, and affect one or more behaviors in one or both directions. In particular embodiments, state changes or behaviors on a particular physical instance 102a may cause corresponding state changes or behaviors to the corresponding virtual instance 102b of the mobile device. Alternatively or in addition, state changes resulting from execution, modification, re-configuration, etc. of the virtual instance 102b may result in state changes to, or behaviors of, the physical instance 102a of the mobile device. For example, an administrator may run the virtual instance 102b of the mobile device (for example, to fix a problem the user is experiencing during a help-desk call) and trigger the device management server 104 to synchronize the resulting state and behavior of the virtual instance with the physical instance 102a of the mobile device. More particularly, a mobile device user may even watch the display screen of the physical instance 102a of the mobile device, as a help desk operator controls the virtual instance 102b of the mobile device to accomplish an action, such as retrieving a desired document, configuring an email client, among a wide assortment of actions. The state and behavior information may be transmitted to the control client 302 which may implement the resulting changes. Furthermore, in some particular embodiments, synchronization of state and behavior may operate in real-time. In other embodiments, an administrator may change one or more policies by modifying the virtual instance 102b of the mobile device and cause device management server 104 to synchronize the policy change with the physical instance 102a of the mobile device at a later (scheduled or otherwise available) time.

In some embodiments, device management server 104 may be operative to proxy transactions, sessions and/or connections between a physical instance 102a of a mobile device and other logical or physical nodes, such as enterprise application services, and the like. For example, in one embodiment, the virtual instance 102b of the mobile device may be used as a proxy, which accesses enterprise application 124. The resulting changes to device state, file system state and data that can be used to simulate user-observed behaviors on the display screen of the physical device instance 102a may be communicated back to the physical instance of the mobile device and rendered on the display and otherwise effected by the control client 302. In alternate embodiments, device management server 104 may simply proxy the connection and selectively transmit data messages from the enterprise application server (for example) to both the physical and virtual instances 102a and 102b of the mobile device.

Maintaining a virtual instance of a mobile device at a remote device management server facilitates a variety of configuration, management, troubleshooting and/or security functions. For example, the virtual instance provides an administrator a detailed snapshot of the state of the mobile device. The virtual instance also allows an administrator to perform management operations, such as virus/malware scans, application/image certification, etc., on the virtual instance of the mobile device, without consuming computing resources of the physical instance of the mobile device.

Figure 3:
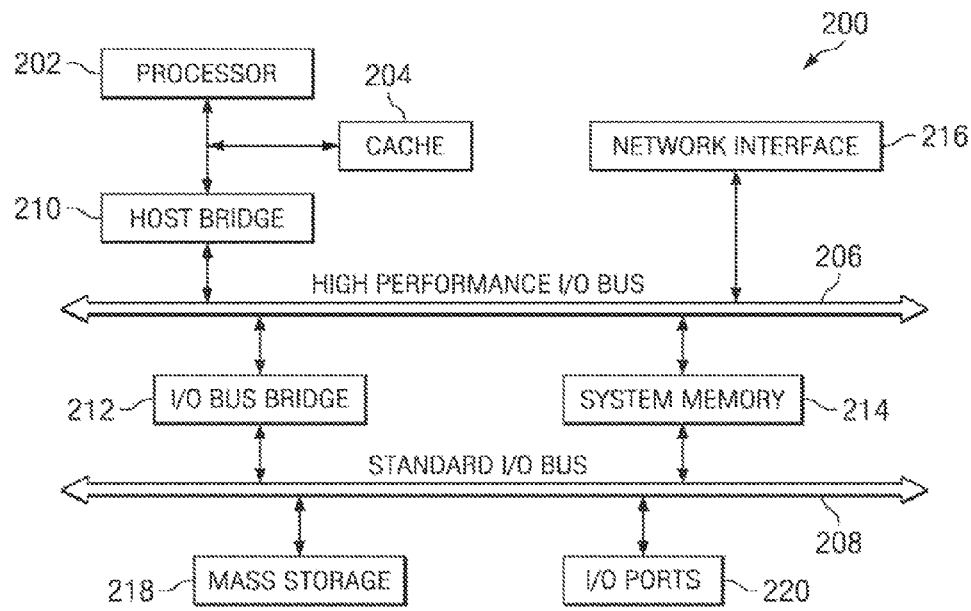
FIG. 3 is a schematic diagram illustrating an example server system architecture.

FIG. 3 illustrates an example computing system architecture, which may be used to implement a physical server. In one embodiment, computing system 200 comprises a processor 202, a cache memory 204, and one or more software applications and drivers directed to the functions described herein. Additionally, computing system 200 may include a high performance input/output (I/O) bus 206 and a standard I/O bus 208. A host bridge 210 may couple processor 202 to high performance I/O bus 206, whereas I/O bus bridge 212 may couple the two buses 206 and 208 to one another. A system memory 214 and a network/communication interface 216 may be coupled to bus 206. Computing system 200 may further include video memory (not shown) and a display device coupled to the video memory. Mass storage 218 and I/O ports 220 may be coupled to bus 208. Computing system 200 may also optionally include a keyboard and pointing device (or other input device), and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of computing system 200 are described in greater detail below. In particular, network interface 216 provides communication between computing system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Computing system 200 may include a variety of system architectures; and various components of computing system 200 may be rearranged. For example, cache 204 may be on-chip with processor 202. Alternatively, cache 204 and processor 202 may be packed together as a "processor module," with processor 202 being referred to as the "processor core." Furthermore, certain embodiments may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one embodiment, the operations of one or more of the physical servers (e.g., device management server 104 (which may itself be comprised of one or more servers) and those servers within the enterprise network 115) described herein are implemented as a series of software routines run by a computing system 200. These software routines comprise a plurality or series of instructions to be executed by one or more processors in the hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, rather, they could be retrieved/received from a remote storage device, such as a server on a network, via network/communication interface 216. The instructions may be copied from the storage device, such as mass storage 218, into memory 214 and then accessed and executed by processor 202.

An operating system manages and controls the operation of computing system 200, including the input and output of data to and from software applications (not shown). The operating system provides an interface between the software applications being executed on the system and the hardware components of the system. According to one embodiment, the operating system is the Windows® 95/98/NT/XP operating system, available from Microsoft Corporation of Redmond, Wash. However, various embodiments may utilize other suitable operating systems, such as the Apple Macintosh Operating System, available from Apple Computer Inc. of Cupertino, Calif., UNIX operating systems, LINUX operating systems, and the like. Of course, other suitable implementations may be possible. For example, the server functionalities described herein may be implemented by a plurality of server blades communicating over a backplane.

Figure 4:
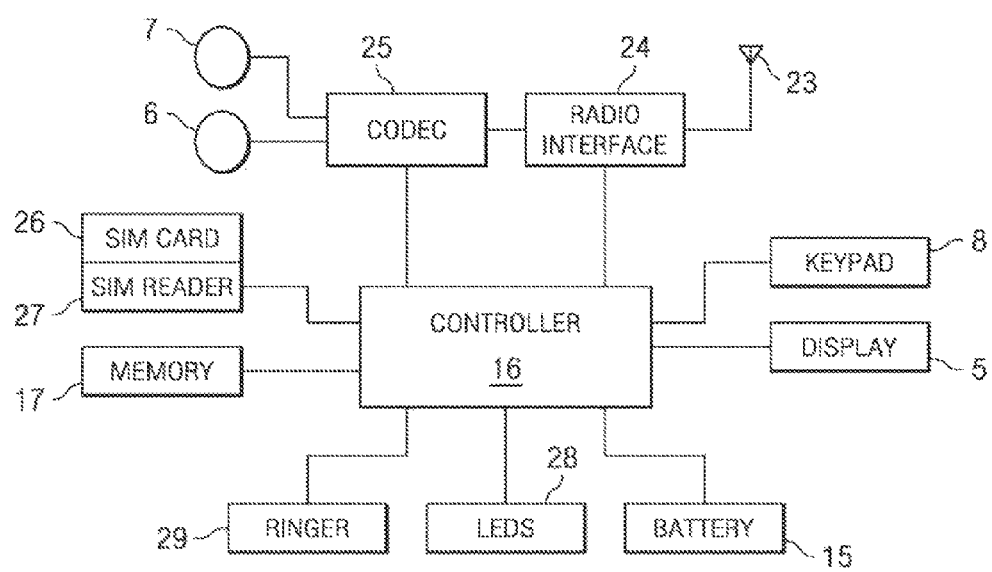
FIG. 4 is a schematic diagram illustrating an example mobile device system architecture.

FIG. 4 shows a schematic representation of the main components of an example mobile device 102a, according to various particular embodiments, which is adapted for use in connection with a GSM network or any other mobile telephone network and may also be configured to meet the wireless application protocol specification (WAP). In various embodiments, any type of wireless or other communications link may be utilized. For example, the wireless communication network over which mobile devices 102 communicate may utilize a cellular-based communication infrastructure that includes cellular-based communication protocols such as AMPS, CDMA, TDMA, GSM, iDEN, GPRS, EDGE, UMTS, WCDMA and their variants, among others.

Signal processing may be carried out under the control of a digital microcontroller 16 which has an associated RAM/ROM and flash memory 17. Electric analog signals may be produced by microphone 7 and fed to earpiece 6. The controller 16 may receive instruction signals from the keypad 8 including soft keys and control the operation of the display 5. Radio signals are transmitted and received by means of an antenna 23 that may be connected through a radio interface 24 to a codec 25 configured to process signals under control of the controller 16. Thus, in use, for speech, the codec 25 receives analog signals from the microphone 7, digitizes them into a form suitable for transmission and feeds them to the radio interface 24 for transmission through antenna element 23 to the public land mobile network (PLMN). Similarly, received signals are fed to codec 25 so as to produce analog signals which are fed to ear piece 6. The mobile device 102a may also include a subscriber identification module (SIM) card 26, a SIM card reader 27, light emitting diodes (LEDs) 28 and a ringer 29. In some embodiments, mobile device 102a is also a dual mode phone having a wireless local area network (WLAN) interface, as well as other wireless or physical interfaces (such as BlueTooth® and USB). Additionally, the mobile device 102a may be powered by a removable battery pack 15.

Figure 5:
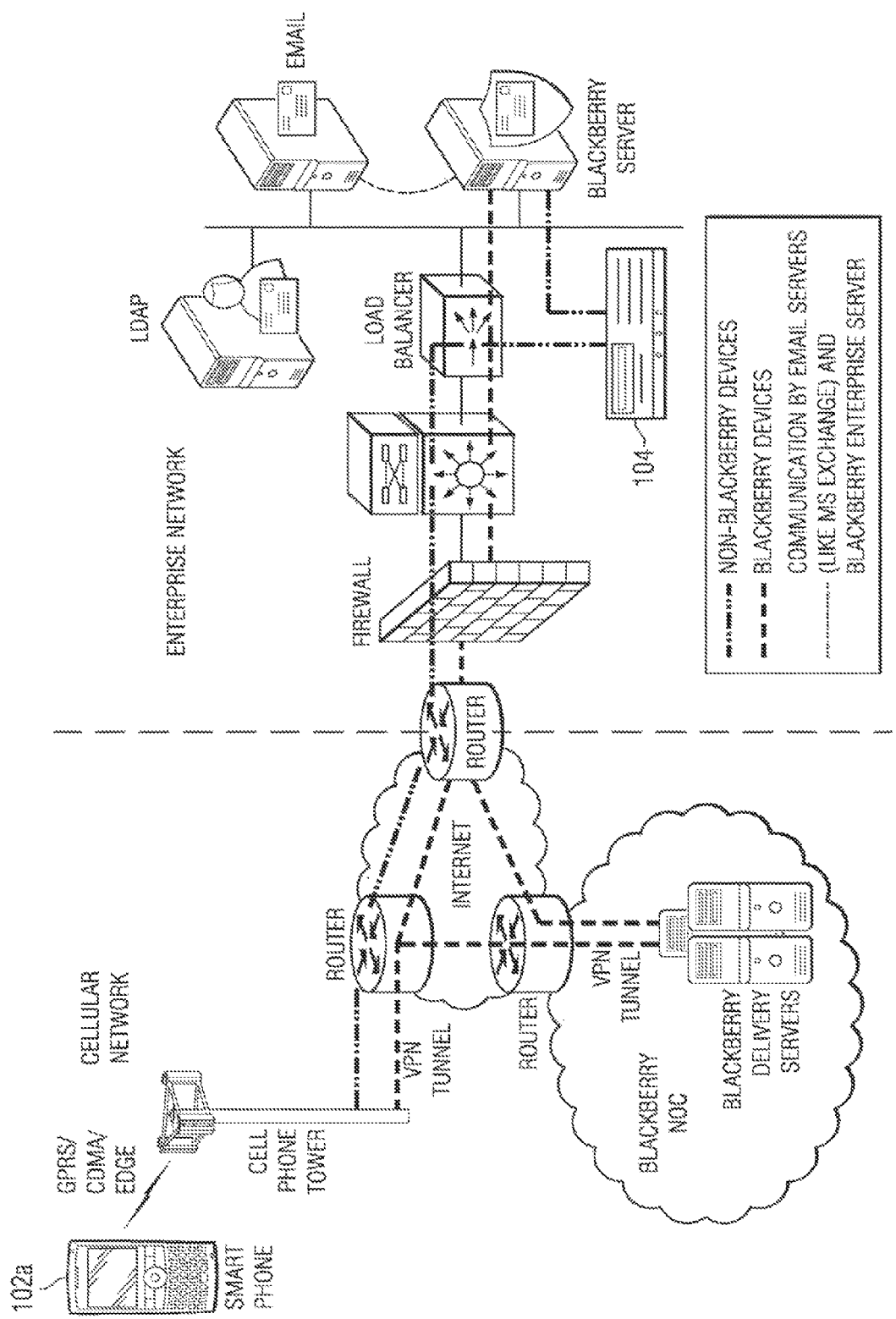
FIG. 5 is a schematic diagram illustrating example application proxy functions.

FIG. 5 shows an example deployment of device management server 104 in a proxy mode, in which device management server 104 proxies sessions between mobile devices 102a and one or more enterprise applications. Device management server 104, when acting as a proxy device, can proxy the applications so any specific environments (like BlackBerry®) can be generalized so that any device can be used for that specific environment. For example, device management server 104 can act as a BlackBerry® device to the BlackBerry® network service environment for non- BlackBerry® mobile devices. Additionally, the proxy service benefits users when they want to migrate to another environment different from their current one. In the example illustrated in FIG. 5, device management server 104 is acting as a proxy for a BlackBerry® (or other mobile email) service.

BlackBerry® service requires all mobile traffic to be received at their Network Operations Center (NOC) first before entering the enterprise network. A typical BlackBerry® solution includes Blackberry enterprise servers, and a BlackBerry® gateway in the NOC. All the traffic going in and out of mobile clients will first hit the mobile gateway in the BlackBerry® NOC before going anywhere else (including internet destinations). In this way, BlackBerry® provides the end to end security from mobile client all the way through the enterprise email servers, thus providing the confidentiality to the enterprise user traffic. Any traffic destined to the internet will first go to the BlackBerry® NOC prior to the final destination. In FIG. 5, the red line indicates traffic flow in a BlackBerry® environment, while the blue line indicates normal traffic flow. To provide BlackBerry® services to the normal users, one can deploy device management server 104 as an Application Proxy server. In this case, all the BlackBerry user traffic may go directly between the BlackBerry enterprise server and the BlackBerry gateway in the NOC. All the traffic from non-blackberry devices will go through the device management server 104 for Blackberry services.

Conventionally, mobile device management is often difficult and challenging as the mobile devices generally cannot be reached easily because of the different networks they operate on. Embodiments of the present disclosure facilitate or provide an architecture that eases device management, security and collaboration issues through an innovate architecture using virtualization. In a particular embodiment, a virtual instance 102b of a mobile device running in a network performs resource intensive process, and passes the results of that processing (e.g., through synchronization and other data transfers) to the physical instance 102a of the mobile device. In this manner, the user experience may be improved on the mobile device.

Figure 6:
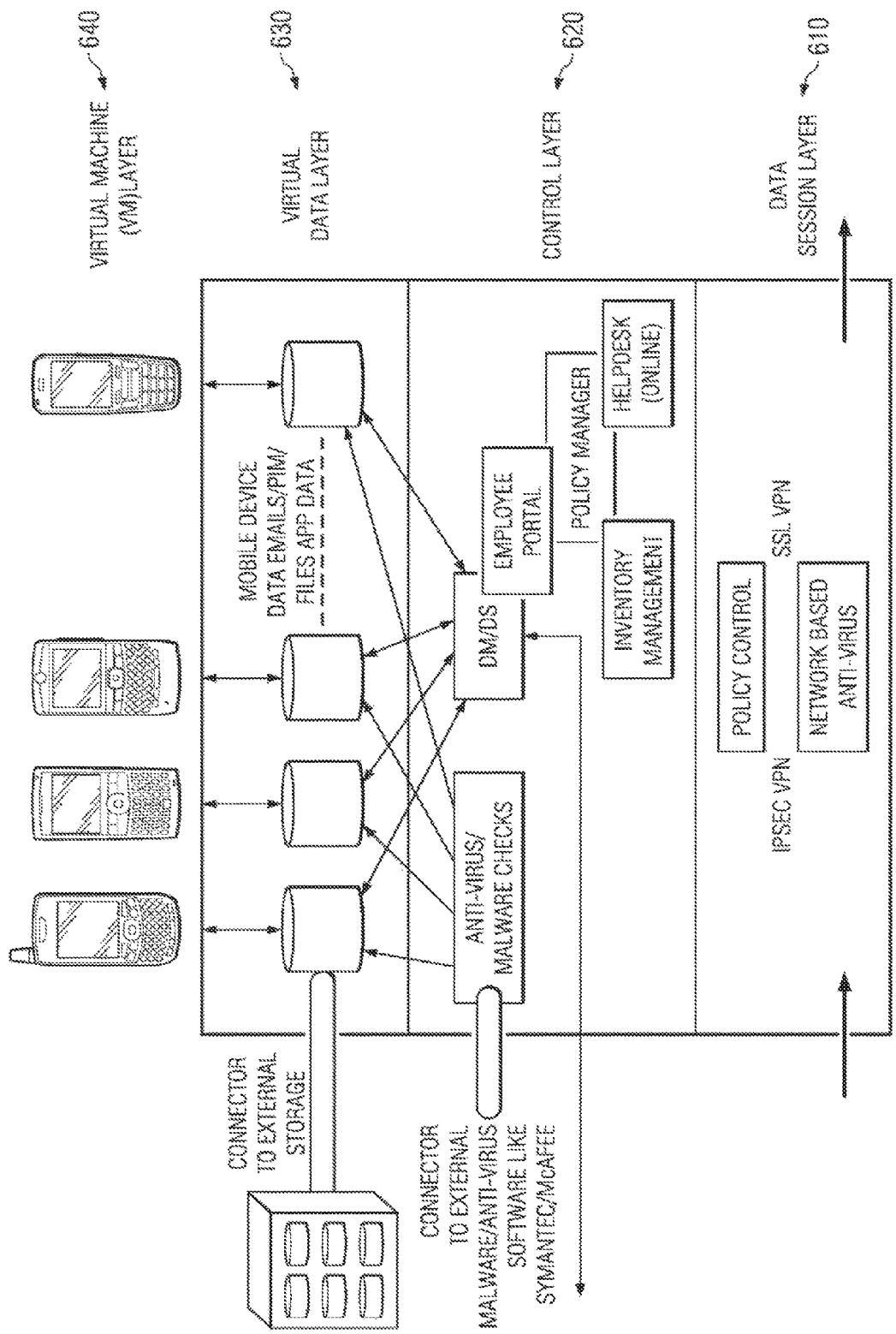
FIG. 6 is a diagram illustrating example device virtualization layers.

FIG. 6 illustrates an example mobile device virtualization architecture according to a particular embodiment. The virtualization architecture comprises four functional layers. Depending on the functionality or the task to be performed, one or more of the function layers may be used to perform a given operation or task. The four layers are data session layer 610, control layer 620, virtual data layer 630 and the virtual machine/instance (VM) layer 640.

Data session layer 610 is responsible for handling data session related functions. This layer acts as a proxy for all the session traffic going between the mobile devices and the application servers. Services like IPSEC VPN, SSL-VPN, Firewall or Network based Anti-virus functions are hosted in this layer. Data session layer 610 may maintain a session table for all the traffic to steer the traffic appropriately.

Control layer 620 is the main layer where most control functions are hosted. Policy settings, device management, data synchronization, and anti-virus engine may run in the control layer. For example, control of the data is implemented in this layer.

Virtual data layer 630 is where copies of the mobile device data are maintained. Data synchronization service in the control layer will synchronize the data between the mobile device and the virtual data layer copy of the mobile device data. OMA DS standard can be used for the synchronization services. Anti-virus software running in the control layer can work on this virtual data to provide the anti-virus functionality to the end device. If the anti-virus service finds any abnormality then the mobile device may be placed into quarantine until the virus has been cleaned and removed from the actual device.

VM layer 640 is the layer where the virtual instances 102b of the client devices reside. The virtual instances 102b are executing replicas of the actual physical instances 102a of the mobile devices exhibiting substantially the same behavior and functionality. These virtual instances need not run all the time and can be brought up and down depending on need. This VM layer 640 may execute on top of virtual containers or virtual machine monitors, provided by companies such as, for example, XenSource™, VMware or KVM (Kernel Virtual Machine). As discussed below, the VM layer 640 can be configured in at least two ways: full hardware and software emulation of the mobile device, or software-only emulation.

VM layer 640, in a particular embodiment, includes functionality that virtualizes substantially the entire physical instance 102a of a mobile device including the hardware and software. In this implementation, the mobile device image can be extracted from the mobile device and run in the VM layer 640. In such an embodiment, the VM layer 640 includes hardware emulation functionality. For example, the mobile device processor instruction set could be x86, ARM or some other instruction set that supports or emulates the processor that the mobile phone is running.

Figure 7:
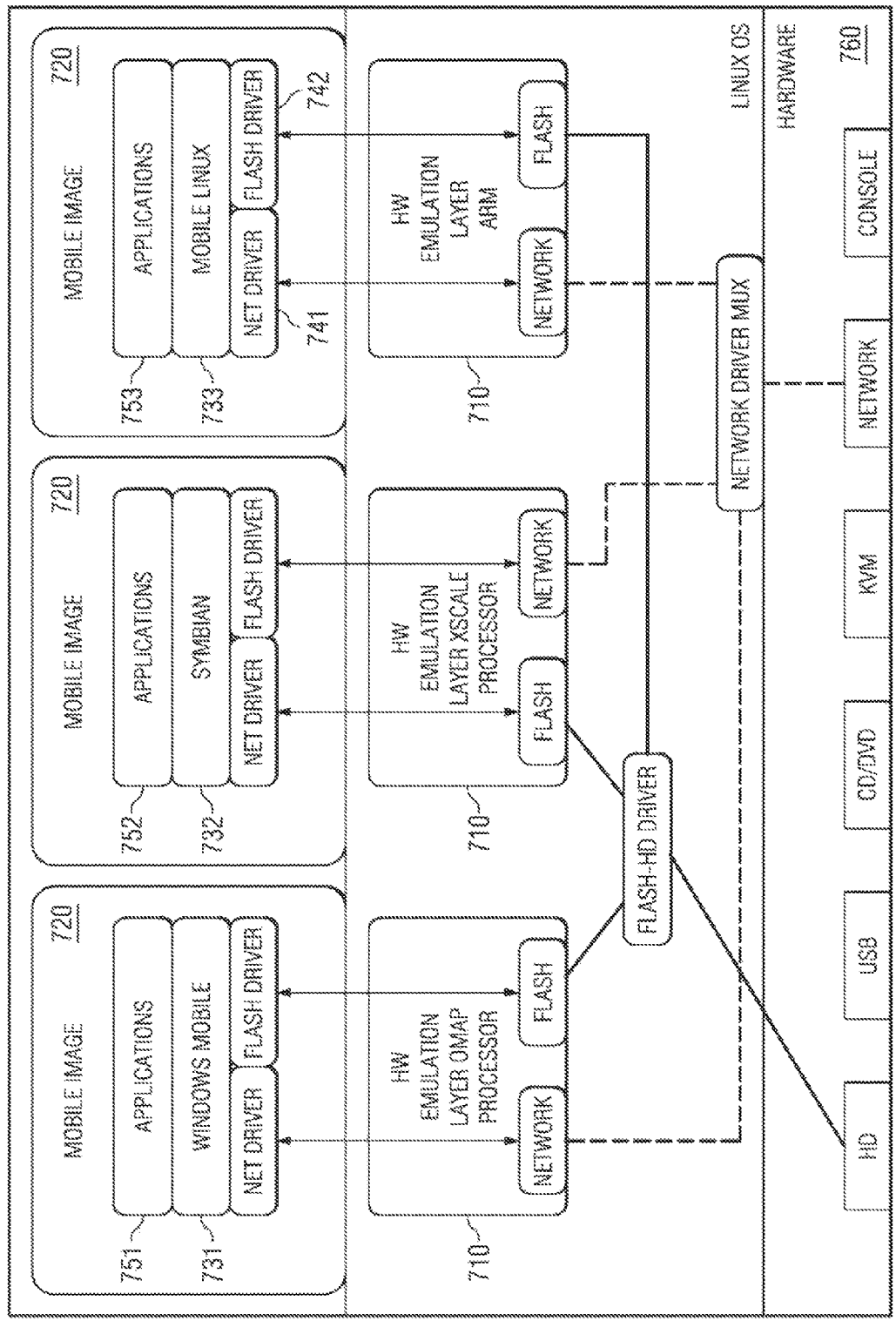
FIG. 7 is a diagram illustrating mobile device virtualization functionality.

FIG. 7 illustrates an example virtualization architecture according to one embodiment. In a particular implementation, the virtualization layer includes, for a given mobile device, a hardware emulation layer 710 (including network and storage device emulation) and a software emulation layer 720 (including operating system 731, 732, 733, virtual device drivers 741, 742, and one or more applications 751, 752, 753). The bottom layer 760 may be the hardware layer of the host (in one implementation, device management server 104). In a particular implementation, a native operating system, such as Linux, runs on top of the hardware layer. In the native operating system, virtual containers may be created for the virtual instances 102b of the mobile devices to run. In the virtualization system, the hardware emulation layer 710 includes communication layers for network and storage (e.g., Flash memory) systems. Flash driver mux and network driver mux may act as the gateway for all the network and memory related activities associated with the virtual instances.

Hardware emulation, in one embodiment, features bit to bit emulation of the real hardware for the mobile device image to run. In such a model, the software image may not be modified or changed to run in the virtual instance 102b, hence, whatever hardware the mobile phone has for which the image has been built is to be emulated exactly in the device management server 104. Hardware emulation functionality will typically vary with the many different hardware models. Depending on the mobile device, the corresponding hardware or processor chip is emulated in the appliance. To reduce the work on the virtual instance 102b, a subset of the hardware can be virtualized, such as the processor, memory model and other important peripherals like flash, bootrom, etc. In one embodiment, the choices as to which aspects are virtualized are application-driven. In other words, since management of applications may be important, any hardware that is required to support the applications may be virtually emulated. For example, two aspects that a majority of applications require are network access and flash space to store data. Virtualizing other hardware components such as, for example, WiFi, GPS, GSM, Camera, Speakerphone etc., in the virtual instance 102b may be optional and may depend on the applications supported by device management server 104. In addition, a virtual instance 102b of a mobile device may include all or a subset of the applications installed on the corresponding physical instance 102a of the mobile device.

The hardware emulation layer 710 generally includes various hardware emulation components or modules, each of which may correspond to one or more pieces of hardware in the physical instance 102a of the mobile device to which the virtual instance 102b corresponds. For example, the hardware emulation layer may include a processor emulator that emulates the processor of the corresponding physical instance 102a of the mobile device, a memory emulator that emulates the memory storage or subsystem of the corresponding physical instance of the mobile device, a network interface emulator that emulates the one or more network interfaces, e.g., WiFi, Bluetooth, etc., of the corresponding physical instance of the mobile device, an input/output (I/O) emulator that emulates the one or more I/O devices, e.g., keypads, wheels, sliders, buttons, etc., of the corresponding physical instance of the mobile device, a display emulator that emulates the display screen on the corresponding physical instance of the mobile device, etc. Each emulator imitates or duplicates the behavior of the piece of hardware it emulates and, furthermore, may maintain the look, feel, operations, characteristics, behavior, etc. of the original pieces of hardware.

There are a variety of different ways to implement the individual emulators or modules included in the hardware emulation layer. According to one embodiment, the emulators or modules are implemented as computer-executable programs, represented by computer program instructions stored in various forms of tangible computer-readable media. For example, one way to emulate the processor of a physical instance 102a of a mobile device is to use an interpreter, which follows the execution flow of the program code and, for every machine code instruction encountered, executes operations on the processor(s) of the device management server 104 that are semantically equivalent to the original instruction. Some pre-packaged CPU simulators may also be incorporated into the process emulator. A way to emulate the memory storage of a physical instance 102a of a mobile device is to use an array of elements, each corresponding to a memory location within the memory storage on the physical instance of the mobile device. The hardware emulation programs may be loaded into a computer runtime environment for execution in order to emulate the operations and/or behaviors of the hardware components of the corresponding physical instance 102a of the mobile device for which these programs emulate.

In a particular embodiment, hardware emulation layer 710 is a part of a virtual mobile device platform. The device management server 104 causes the hardware emulation layer of a virtual instance 102b of a particular mobile device to be executed when there is a need to emulate one or more pieces of hardware of the corresponding physical instance 102a of the particular mobile device. For example, when the device management server 104 emulates the software operations of the physical instance 102a of a particular mobile device, it first loads the hardware emulation layer of the virtual instance 102b of that mobile device and then executes a copy of the software of the physical instance of the mobile device within the context of the hardware emulation layer.

To emulate the software components of a physical instance 102a of a mobile device, according to one embodiment, the corresponding virtual instance 102b of the mobile device includes a software emulation layer, which includes a copy of the operating system, one or more device drivers, and/or one or more applications on the physical instance of the mobile device. For example, application software on a mobile device may include email, messaging, calendar, task list, address book, device settings, etc.

The software may be executed within the context of the hardware emulation layer of the virtual instance 102b of the mobile device as described above to replicate the behavior, operations, and/or characteristics of the same software being executed on the corresponding physical instance of the mobile device. For example, to emulate a specific piece of application software, the device manage server 104 may first cause the hardware emulation layer to be loaded and executed, and then cause the copy of the piece of application software from the software emulation layer 720 to be executed on top of the hardware emulation layer 710, i.e., interacting with the hardware emulation layer 710, thus imitating the piece of software being executed on the physical instance of the mobile device and interacting with the actual hardware components.

In a physical instance 102a of a mobile device, communications may generally occur through the GPRS stack or WiFi stack. Device management server 104 hosts virtual hardware for storage and network hardware components. Custom drivers may be built for this virtual hardware which resides in the device management server 104. In one implementation, the drivers for these virtual hardware devices are installed on the physical instance 102a of the mobile device as well so that the virtual drivers become part of the software image on the mobile device. These two drivers may have no function in the actual physical instance 102a of the mobile device as there may be no hardware corresponding to those drivers and hence they will not be loaded. When the software image is extracted and run in the virtual instance 102b, however, all other drivers will fail (not be loaded) except the virtual drivers because there is no real hardware emulation for devices like GPS, WiFi, GSM, Speakerphone, etc. Virtual drivers will find the virtual hardware, like network and flash, so they will attach themselves to this virtual hardware. The network driver provides the glue to the communication between the virtual instance 102b and the device management server 104 and similarly a virtual Flash driver will provide the glue for virtual instance flash layer and the data storage attached to or available to device management server 104.

In a particular embodiment, the communication between the virtual instance 102b and the device management server 104 happens through the two main drivers; that is, the virtual network driver and the flash driver. The virtual network driver of each virtual instance 102b communicates with the virtualization layer network driver (Network Driver Mux) of device management server 104 through the network hardware emulation functionality. The network driver of the virtualization layer of device management server 104 may act as a multiplexer in the sense that it will communicate with all the virtual instances 102b and the actual network interface(s) in the device management server 104. There can be two types of communication that can happen between a given virtual instance 102b and the outside. One is the virtual instance 102b talking to the device management server 104 and the other is the virtual instance talking to remote devices and hosts. Since the device management server 104 has full control of the virtual instances 102b and the virtual instances communicate through the device management server 104, device management server 104 may act as a gateway for the virtual instances.

In one embodiment, device management server 104 may have a DHCP service running where it can assign the IP addresses to the virtual instances 102b as they become live and the device management server's IP address can be configured as the gateway IP address for the virtual instances. An IPSEC client may provide secure connection functionality between the mobile device 102a and device management server 104. The IPSEC client, in a particular embodiment, is able to tolerate IP address changes as the client roams from one network to another. For all the communication that can happen between a given virtual instance 102b and outside devices, device management server 104 can act as a NAT gateway such that there is no need to assign routable IP addresses to the individual virtual instances. For any communication that originates from the outside, a user first authenticates with the device management server 104 and then indicates to which particular virtual instance 102b they want to connect. Based on the user credentials, device management server 104 can grant access to the virtual instance 102b.

In another embodiment, a particular virtual instance 102b replicates the application environment of the corresponding physical instance 102a of the mobile device, but does not replicate the hardware functionality of the actual device. Device management server 104, in a particular embodiment, maintains a repository of mobile device operating systems. By way of example, such operating systems may include Windows Mobile (e.g., Windows Mobile 5.0, Windows Mobile 6.0), Symbian (e.g., Symbian 7.1), Palm, Android (developed by Google and later the Open Handset Alliance), and/or Linux versions, among others. Device management server 104 may also maintain a repository of applications (e.g., salesforce.com, RSS reader, among others) that can be installed on these operating systems. When a new mobile device is registered with device management server 104, the device management server can query all the details of the mobile device including the operating system, applications installed, memory profiles etc., either through OMA DM or via an installed client (e.g., client 302) on the actual mobile device. Device management server 104 preferably maintains information in its database regarding what applications are running on the mobile device and on what operating systems. In particular embodiments, as applications are installed or removed, this information is preferably updated throughout the life of the mobile device to be able to create an accurate virtual instance of a mobile device.

In particular embodiments, the device management server 104 monitors the physical mobile devices 102a (either through the client 302 installed on the actual mobile device or through OMA DM queries) for application installations or removals from the actual device so that the same behavior can be replicated in the corresponding virtual instances 102b. A new application can be installed on a mobile device in a variety of ways. By way of example, a user may install the application or the application may be installed through some automated manner, such as, for example, through OMA DM functionality. Through software and patch management functionality, new software may be installed on the mobile devices without user intervention. In either case (either the user initiated installation or automated installation), the new application installation information may be pushed to the device management server 104 via a client (e.g., client 302) installed on the mobile device.

The newly installed application software may also be maintained in the application repository in the device management server 104 so that the device management server can use it to create the virtual instance 102b of the actual mobile device. In various embodiments, this application software can be made available to the device management server 104 through a variety of means. By way of example, a link to the location of the software may be provided. Alternatively, an administrator may download the application to the repository. Every time there is a change in the software version or new software has been added, one of the above methods may be used to acquire the software. The device management server 104, in one embodiment, acquires application software prior to installing the software on the physical instance 102a of the mobile device such that the corresponding virtual instance 102b can be created with all the applications in real time. These and other applications may have been developed to run on the operating system directly or a common platform such as, for example, J2ME, etc. If an application runs directly on the operating system, there will be a different version of the software for different operating systems; however, if the applications are written for platforms like J2ME, then the same version of the application may be run on all operating systems. In particular embodiments, both types of applications are supported in the device manager application repository.

In particular embodiments, device management server 104 maintains copies of all the operating systems used in the mobile devices under management so that the device manager can create virtual instances 102b of the actual mobile devices. In a particular embodiment, the operating systems are compiled to a common processor or hardware instruction set. Furthermore, the repository of the operating systems may be collected, maintained and distributed by a central service provider for a plurality of enterprises (something similar to the distribution of virus definitions). Whenever ISVs (Independent software vendors like Microsoft Corp or Symbian) release a version of an operating system, the central service provider may download the operating system and keep it in its distribution server. All the individual enterprise device management servers 104 may be equipped with software download managers configured to talk to the software distribution server. Whenever there is new software being added to the distribution servers, registered download managers of the device management servers 104 may be notified of the availability of the new software and, moreover, may be configured to download the software automatically or with user consent.

VM layer 640 generally includes functionality operative to create and maintain multiple virtual instances 102b for any number of corresponding mobile devices in the device management server 104. All the different operating systems that are compiled for the same instruction set as the device manager (for example x86) can be directly run on the host operating system (like Linux). For creating this type of virtualization an existing virtualization technology (e.g., XenSource™ or Virtual Iron®) may be used. If the operating systems are compiled for another instruction set like ARM (which is more popular in the mobile device world) then a JIT conversion mechanism (e.g., QEMU, a device emulator layer where ARM instructions will be converted to x86 instruction in run time) may alternately be used in between the guest operating systems (guest operating systems are those which run in the virtual instances) and the host operating system VM layer.

Mobile Activity Intelligence

The embodiments described thus far with reference to FIGS. 1-7 facilitate the collection of a wide variety of data from a variety of mobile devices and, furthermore, illustrate the efficiency, thoroughness, and flexibility of such data collection from the mobile devices. The present inventors have determined that this ability to collect raw data directly from a mobile (or wireless) device, such as a mobile phone or smart phone, potentially in real-time and subsequently selectively process and analyze this data affords valuable insight into the activity of the user of the mobile device. In particular, such data may include, by way of example, call information (e.g., calling party and location, receiving party and location, roaming information, call duration, signal strength, type of network (e.g., 3G or 2/2.5G), network speed (e.g., kilobytes per second (kB/s) or Megabytes per second (MB/s)), and whether the call was dropped), other Quality of Service (QoS or QOS) information, sent and received SMS text information, other sent and received data and event information, and application usage, among other forms, as will be described in greater detail below.

Extrapolating this "Mobile Activity Intelligence (MAI)" concept to the mobile devices of an entire enterprise (e.g., a private or public company, corporation or business establishment), a manager of the enterprise may then gain valuable insight into the mobile usage activities of all or a portion of the users of the entire enterprise, as well as the QoS experienced by the users. The manager may then exploit this aggregated data to better manage the enterprise's mobile devices, control costs, and monitor Quality of Service. In various embodiments, this may include negotiating with wireless network providers for better rates, policing QoS commitments or claims, optimizing wireless service plans down to individual mobile device granularity, and providing feedback or instruction to mobile users within the enterprise, among other managing goals. To facilitate these and other goals, the raw data received directly from the mobile devices may be selectively and/or automatically filtered, analyzed, and otherwise processed into a number of key reports, as will be further described below, that concisely describe or summarize portions of the data, which may include comparisons over time. These reports may even be customized or tailored to the needs of the particular enterprise.

Moreover, such aggregated data can be stripped of most or all individual and/or enterprise identifying data (hereinafter this process may be referred to as "anonymizing") and further aggregated with that of other enterprises in a central data repository. In this way, a central mobile activity intelligence service provider (hereinafter "central MAI service provider"), by way of example an entity whose customers are the enterprises but that is generally unaffiliated with any individual one of the enterprises, may provide multi-enterprise reports that include aggregated data from a plurality of enterprises and provide valuable insight to each of the enterprises (and others). Such reports may provide feedback on particular phones and carriers among other useful information. Such feedback may be used in determining which phone(s) to buy and which carriers and service plans to use. More generally, such multi-enterprise data may be presented in the form of a consolidated quality of service (QoS) map across all enterprise customers for each specific network service provider or for a combination of two or more network service providers. The consolidated multi-enterprise QoS map may include dropped call percentage, signal strength, whether the network supports 2G or 3G at particular locations, percentage 3G, among other information. It should be reiterated that the central mobile activity intelligence service provider provides an independent source of data (e.g., independent of network service provider or enterprise) and that such data and resultant reports provide concrete quantitative information concerning mobile usage.

Particular embodiments relate to a central MAI service provider that provides MAI services to one or more enterprises. A primary and significant difference between embodiments of the present disclosure and conventional mobile management services is that the data collected and used in particular embodiments of the present disclosure is received directly from the mobile devices (e.g., phones, personal digital assistants (PDAs)), and in particular embodiments, in real-time, rather than from a network carrier or service provider (e.g., AT&T, Verizon, T-mobile, etc.). This is in contrast to conventional mobile device management service providers such as, for example, Telecom Expense Management (TEM) providers, which acquire data from the network service providers themselves. As will be appreciated, the methodologies employed by such TEMs is inherently flawed as network service providers generally have no incentive to provide detailed data concerning usage of their networks and what little data they do provide rarely if ever provides quality of service (QoS) information. Thus, there is a significant lack of transparency between a given enterprise and its network service provider(s). As a result, the reports and other feedback provided by TEMs and other mobile device management service providers are based on the limited data (e.g., bills and brief general usage data) voluntarily provided by the network service providers. As such, TEMs and other conventional mobile device management service providers generally perform what is known as "bill scraping" or bill auditing. That is, the conventional mobile device management service provider analyzes the bills provided to a particular enterprise by the associated network service provider and checks for simple billing errors (e.g., for didactic purposes a particular call to Brazil was charged at $4.99/minute rather than the correct $3.99/minute). While this information is useful, as it is estimated that approximately 8-12% of an enterprise's phone bill results from erroneous charges, it leaves much to be desired.

Such data and reports provided by conventional mobile device management service providers are obviously limited in their usefulness. By way of example, a given enterprise may hope to negotiate with its network service provider for a better rate based on the reports. However, the enterprise's negotiating leverage is severely limited since the limited data used to generate the reports was provided by the network service provider itself. To further complicate the challenges an enterprise faces, different employees may have different billing plans. By way of example, in general, most employees will have corporate liable mobile device (phone) plans. These plans are billed to the enterprise. However, some employees may wish to use their own personal phones for enterprise related calls, text, data transmission and other enterprise usage. Such plans are known as individual liable plans. Such plans are billed to the individual user. Generally, the user pays the bill and then submits an expense report (e.g., monthly) to the enterprise seeking reimbursement for the user's enterprise related mobile activities. Unfortunately for the enterprise, the enterprise often has no means to analyze the expense report and verify its accuracy let alone aggregate data from multiple employees across billing plans. Moreover, the enterprise may elicit mobile service from a plurality of different network service providers. Unfortunately, conventional mobile device management service providers are unable to aggregate data across network carriers.

Particular embodiments of the present disclosure solve most or all of the problems associated with conventional mobile device management service providers. In particular, a central mobile activity intelligence provider may receive any and all data directly from the mobile phones associated with a given enterprise, filter, analyze, and otherwise process the data, and provide customized reports to the enterprise thereby allowing the enterprise to have a better information balance between what the enterprise knows and what its network service provider(s) know. By way of example, in particular embodiments key reports may include voice summary reports, carrier summary reports, international roaming reports, dropped call reports, and home zone reports, among others, as will be described in further detail below. Such knowledge may enable the enterprise to significantly reduce its costs by utilizing this knowledge to monitor cost drivers, negotiate with network service providers for better rates and to optimize its service plans as well as to verify quality of service (QoS) or compliance and enforce a service level agreement (SLA). SLAs are virtually unheard of in the mobile network service provider arena as, conventionally, good SLAs are impossible to enforce. Furthermore, this raw and/or processed data may be stored in a database and compared with other related data over time to gauge the effectiveness of the enterprise's current mobile deployment. Alternatively, the central MAI service provider may even provide raw or processed data to conventional mobile device management service providers who may then produce reports for the enterprises.

In particular embodiments, the raw data may be sent directly from the mobile devices to a central mobile activity intelligence server (hereinafter "central MAI server"). In a particular embodiment, central MAI server may include similar functionality as device management server 104 described above. In one particular embodiment, central MAI server may even be a device management server 104 of a particular enterprise. In alternate embodiments, central MAI server may be a separate server that may receive data from one or more device management servers 104 from one or more enterprises, respectively. In turn, each device management server 104 may receive its data directly from a plurality of mobile devices themselves via a client installed or otherwise contained in each mobile device.

In particular embodiments, the client may have some similar functionality to the client 302 described above. In one particular embodiment, the client may even be client 302 described above. In one particular embodiment, the client may filter or otherwise process raw data before transmitting the data to device management server 104 or other central MAI server. In one embodiment, the central MAI server may receive data at predetermined or periodic intervals, or upon a request by either the central MAI server or a data management server 104. In another embodiment, the central MAI server includes some or all of the functionality of the device management server 104 described above. In such an embodiment, the central MAI server may receive data directly from the mobile devices of one or more enterprises rather than or in addition to from one or more enterprise servers such as device management servers 104. Furthermore, the central MAI server may be linked or networked to a central MAI repository or database for storing data collected by the MAI server.

Alternatively or additionally, the device management server 104 may obtain its data from a database containing the virtual instance 102b corresponding to the physical instance 102a of the mobile device. In some embodiments, in effect, data collection from the virtual instance 102b may be considered direct data from the associated mobile device given that the virtual instance 102b may be synchronized often (even in real time) with the corresponding physical instance 102a of the mobile device.

The data collected may vary widely based in part on the needs of a particular enterprise. By way of example, the collected data may comprise voice (or call) usage information, SMS usage information, other data usage information (e.g., MMS or internet/web browser data usage), location data and application use data. In particular, voice usage information may include the number of calls made by a particular user, group of users (e.g., a department) or the entire enterprise. Voice usage information may also include the durations of such calls, the identity of a user placing a particular call, information concerning the receiver of a particular call, calling patterns of particular users or groups, percentage domestic versus international, the location of the user or receiver of the call at the time of the call (which may be determined using GPS technology incorporated into the corresponding mobile phone), the type of network used to make the call (e.g., 3G or 2G, as well as carrier), among other information. In a particular embodiment, the central mobile activity intelligence server keeps track of how many and which calls were dropped. The central mobile activity intelligence server may also track roaming (particularly international roaming) information. By way of example, the central mobile activity intelligence server may track users that have high roaming usage or users that are currently roaming. This and other roaming information may be reported to managers, particularly an MAI manager or associated enterprise managers, in real-time or on other time bases.

In one particular embodiment, a manager of the central MAI server or a particular enterprise may be presented with a user interface enabling the manager to send an alert to particular roaming users. In another particular embodiment, these and other alerts may be sent to mobile phone users and enterprise managers automatically by the central MAI server. Automatic alerts may be sent, by way of example, once a mobile phone initiates roaming, at periodic intervals while the user is roaming, and/or once a mobile phone has been roaming for a predetermined threshold of time or once the user has accumulated a threshold level of minutes in a particular period of time such as, for example, in a particular day or month (hereinafter these may be referred to as "threshold alerts"). As another example, a particular mobile device may receive a threshold alert when the user has used a threshold number of minutes that call, day, week, month, or configurable period of time. As other examples, a threshold alert might be received when the user has used a threshold number of MB of data, or made a certain number of calls to a toll number, or reached other thresholds of phone activity.

The central mobile activity intelligence server may also be configured to send out exception alerts. Exception alerts may be sent to mobile phones of users who conduct irregular activity, such as, by way of example, users who are roaming. These roaming alerts may be sent periodically or upon initiation of roaming, for example. In particular embodiments, exception alerts may be sent to users who are not permitted by the enterprise to use their phones internationally. As another example, an exception alert may be sent to a particular mobile device when the user of the device attempts to use the device in an unauthorized way, such as, for example, using the device to access a particular class of website, or a website in general. In addition to sending threshold and exception alerts to mobile phones or managers, regular event alerts may also be sent to particular mobile devices and managers in response to regular or expected activity such as, by way of example, an alert showing the number of minutes used in a particular call, hour, day, week or month. These and other alerts may be received in a number of ways. By way of example, various alerts may be sent through SMS, email, PIN, or web notification, among other ways.

In particular embodiments, the alerts may be automatically sent hierarchically; that is, an alert may be first sent to a particular mobile device such as when, by way of example, the user starts roaming. In a particular embodiment, the alert may include a warning indicating what will happen if the user continues roaming for a threshold number of minutes. In one particular embodiment, after the mobile device has been roaming for a first threshold number of minutes (e.g., 100 minutes), both the mobile device and a manager may receive an alert signaling that the user has been roaming for the threshold number of minutes. The alert may also include a warning of what will happen upon further roaming usage. Upon reaching a second tier of use (e.g., 500 minutes), the mobile device, manager, and, for example, finance department may receive an automatic alert. Upon even further use, the mobile device may be disabled.

In particular embodiments, the MAI server may be configured to automatically shut down or otherwise disable a particular mobile phone that is being used exceedingly or improperly (e.g., contrary to enterprise policy). In another embodiment, a manager may be presented with a user interface that provides the manager the discretion to send an alert to or disable a particular user's mobile phone. By way of example, if a particular mobile device is being abused or may be potentially lost or stolen, an enterprise may want to automatically block connectivity to the enterprise by the particular mobile device, block usage of the mobile device in general, wipe the memory of the mobile phone or switch the user/mobile device to a different security policy. Such instances may be automatically detected by, for example, spikes in call volume, data volume, roaming, or excessive data being copied to removable media, among others. In various embodiments, an enterprise may want to be notified before or after the phone is disabled. By way of example, an enterprise may want to disable service associated with a particular SIM card. This may be accomplished manually by calling the associated carrier upon receiving an alert that the mobile device may be being used improperly. In other particular embodiments, the carrier may be notified automatically by the central MAI server.

Similar to voice usage, SMS and other data usage may also be tracked. By way of example, the central MAI server may track the number of SMS messages sent and/or received, the quantity (e.g., in kilobytes (kB) or megabytes (MB)) of data sent or received in each SMS message, as well as the quantity of data sent or received in an MMS message, email message, or from the internet. The central MAI server may also track network information (e.g., 3G or 2G, as well as carrier), average or current network speed (e.g., kB/s or MB/s), and from whom, to whom, and when the data was sent, as well as where the transmitting and receiving parties are physically or geographically located. Regarding internet usage, the central MAI server may also track which websites a user navigates to. Additionally, the central MAI server may also be configured to track which applications a user of a mobile device uses, how frequently the user uses each application, which applications the user has downloaded, uploaded or otherwise installed, among other application data.

In particular embodiments, privacy controls may be implemented on an individual, group, department, or enterprise basis, among other divisions. Additionally, privacy controls may vary based on the type of usage (e.g., voice call, SMS, MMS, email, internet, etc.) By way of example, while the central MAI server may track (store) the number of SMS messages sent or received, the central MAI server may not store the content of these messages. In particular embodiments, it is the responsibility of the enterprise manager to legislate privacy controls even though it is the MAI server that may implements the privacy controls. By way of example, an enterprise manager may choose different privacy controls for mobile devices depending on whether a particular mobile device is part of a corporate or individual liable billing plan.

As described above, any and all of this information may be gathered and transmitted to the central mobile activity intelligence server in real-time. In such a manner, the MAI service provider provides potentially real-time visibility to enterprises concerning the voice usage of its employees and may eliminate unexpected charges and related surprises from enterprise phone bills. Moreover, any and all of the data may be used to upgrade or downgrade the billing or service plans of users of associated mobile phones on an individual or group level granularity. By way of example, the MAI server may track and report the users with the highest and lowest voice call usages, the users with the highest/lowest roaming usages, or inactive mobile phones (which may then be removed from the enterprise's service plan). In some embodiments, the MAI server may even track usage rate increases or decreases (i.e., whose usage has increased/decreased the most in a specific period of time or even the rate of change of increase/decrease).

Figure 8:
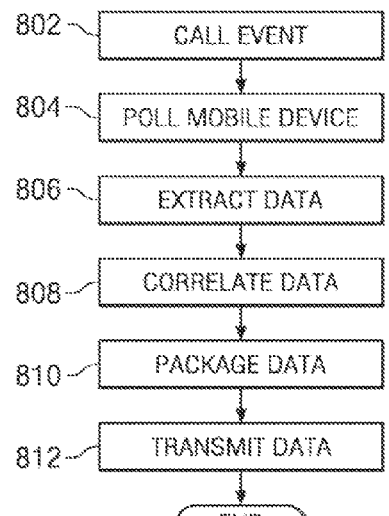
FIG. 8 shows a flowchart illustrating an example process for collecting and receiving call data from a mobile phone.

FIG. 8 shows a flowchart illustrating an example process for collecting and receiving call data from a mobile phone. In a particular embodiment, the data is collected by the client (e.g., client 302) in the background of the normal operations of the mobile device. In some embodiments, any and all of the data described above may be collected and transmitted by the mobile devices on an event driven, periodic or continuous (e.g., whenever available) basis. Data collection for various mobile devices may vary according to the user of the device. By way of example, mobile phones that are roaming may be tracked more frequently than those that are not. The usage data may be temporarily stored in memory within the mobile device (e.g., RAM or flash memory 18 and/or within a database and/or various data storage logs such as, for example, file system log 344, behavior log 352, control log 340, or in other call and data usage logs).

In one particular embodiment, upon occurrence of a call event at 802 (e.g., a call end event corresponding to the termination of a call), the central MAI server polls the mobile device at 804. The mobile device client then extracts usage data associated with the call at 806. By way of example, the call data may include any of the call information described above. This usage data may be collected from, by way of example, any of the aforementioned data storage logs. The mobile device client may then timestamp or otherwise correlate the usage data at 808 based on the time of usage (e.g., start time of the call and end time of the call) and other identifying and descriptive data. In particular embodiments, the usage data is also correlated based on the geographical location (i.e., "location"-stamp the usage data) of the mobile device at the time of the call (e.g., obtained through GPS location data). In particular embodiments, the usage data is also correlated based on the cellular tower used by the mobile device during the call. More particularly, information that is usable in identifying a cellular tower used by the mobile device during use is associated with the usage data (the central MAI server may then use this cellular tower information to identify the specific cellular tower used by the mobile device during the call). In this way, as alluded to above, comprehensive maps may be generated using the geographic and/or cellular tower data as references. In various embodiments, the usage data may also be correlated with other user data, carrier data, enterprise data, etc.

The client or other module may then package (or cause to be packaged) the relevant correlated data at 810 and transmit the packaged data at 812 to the central MAI server. Additionally or alternatively, various data may be collected, correlated, packaged, and transmitted on a periodic or threshold basis (e.g., once data levels reach a predetermined memory level). In alternate embodiments, in which the MAI server receives data from an enterprise device management server (e.g., device management server 104), the MAI server may poll the device management server for the call data. Once at the central MAI server, the data may be filtered, analyzed and otherwise processed and subsequently stored in the central MAI database and utilized to generate reports.

In a similar fashion, SMS text, email or other data usage information may also be collected by the mobile device client and stored in various memory locations and/or SMS and data logs. By way of example, SMS text or MMS message information may be collected, correlated, packaged and transmitted to the central MAI server upon receipt or sending of an SMS or MMS message. As another example, data associated with emails may be transmitted upon receipt or sending of an email message, upon downloading an email message from an email server (e.g., from a Blackberry® server), upon opening of an email, as well as on periodic or threshold bases.

In general, it may be desirable to transmit any of the described data as frequently as possible while keeping power consumption associated with the collecting, correlating, packaging, and (especially) transmitting below a power consumption threshold.

Data from individual mobile devices may then be aggregated and/or otherwise processed, for example on a periodic (e.g., daily) basis, with data from one or more other mobile devices associated with the enterprise irrespective of whether or not the one or more other mobile devices are on the same billing plan or serviced by the same network service provider. In this manner, data from all of the mobile devices of an entire enterprise may be aggregated together and stored in the central MAI database. The central MAI server may then generate a variety of reports for the enterprise. By way of example, the reports may be generated on a periodic basis (e.g., daily, weekly, monthly, yearly) or whenever requested.

Figure 9A:
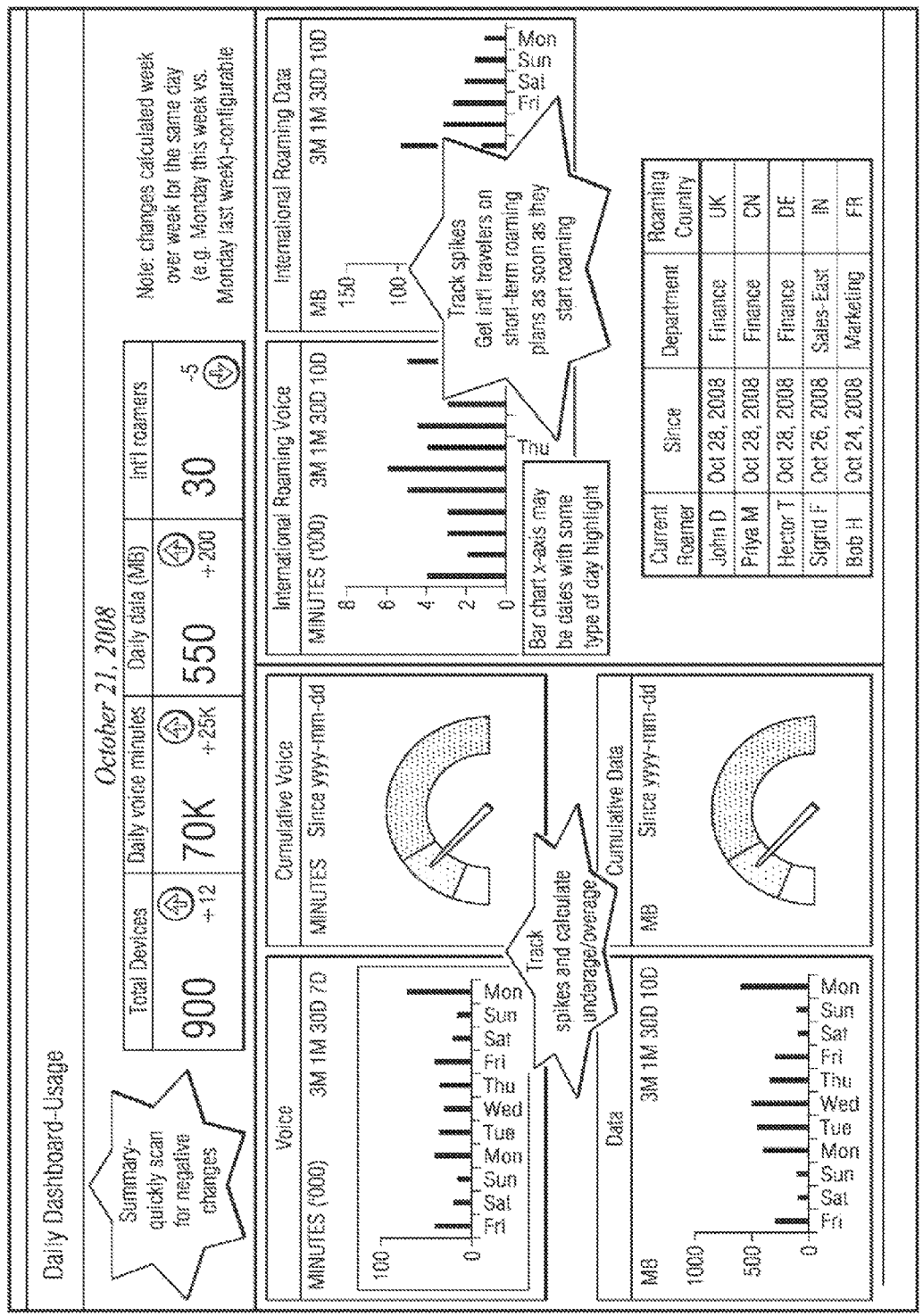
FIGS. 9A-9D illustrate example usage, security, and quality of service reports.
Figure 9B:
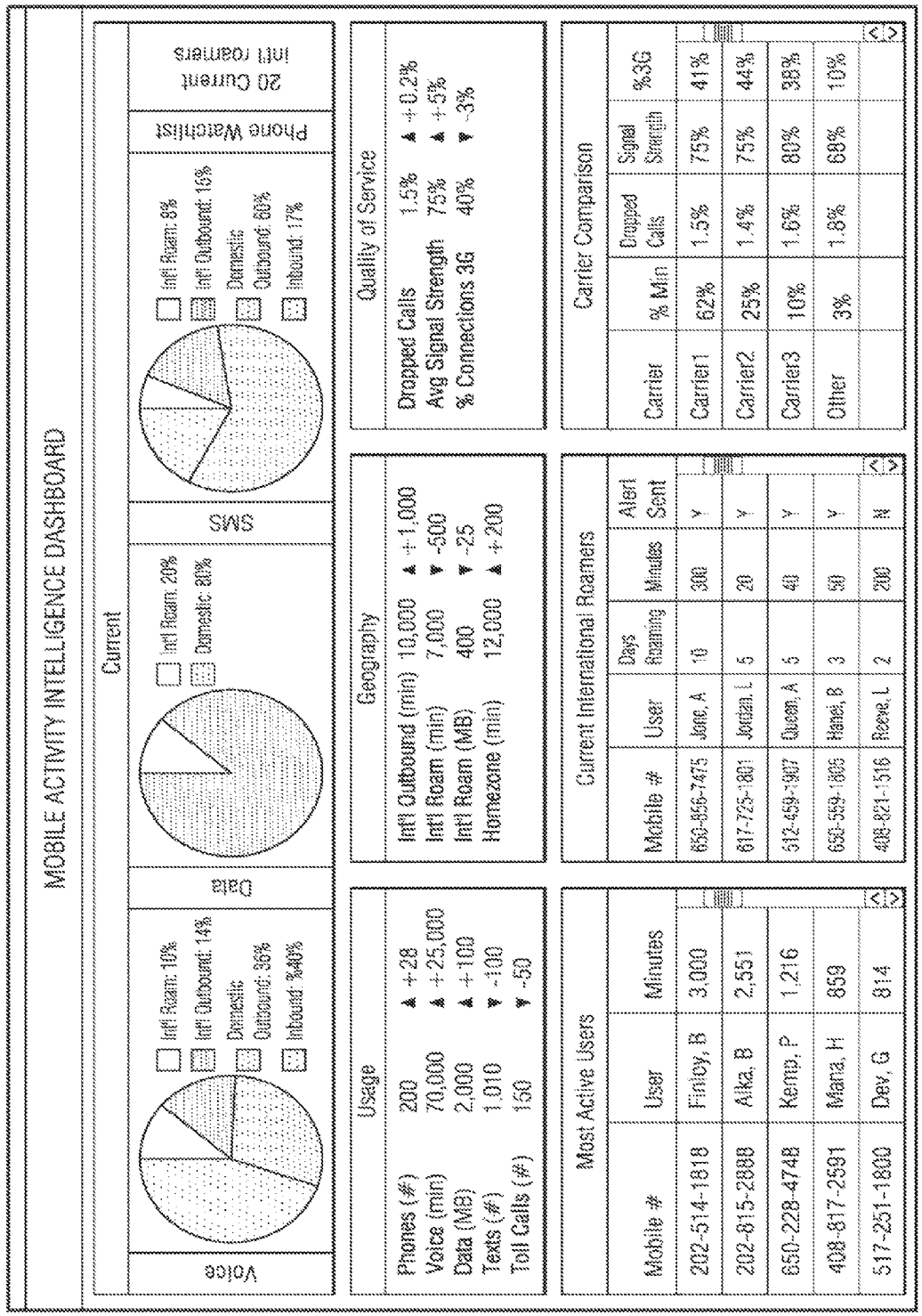
Figure 9C:
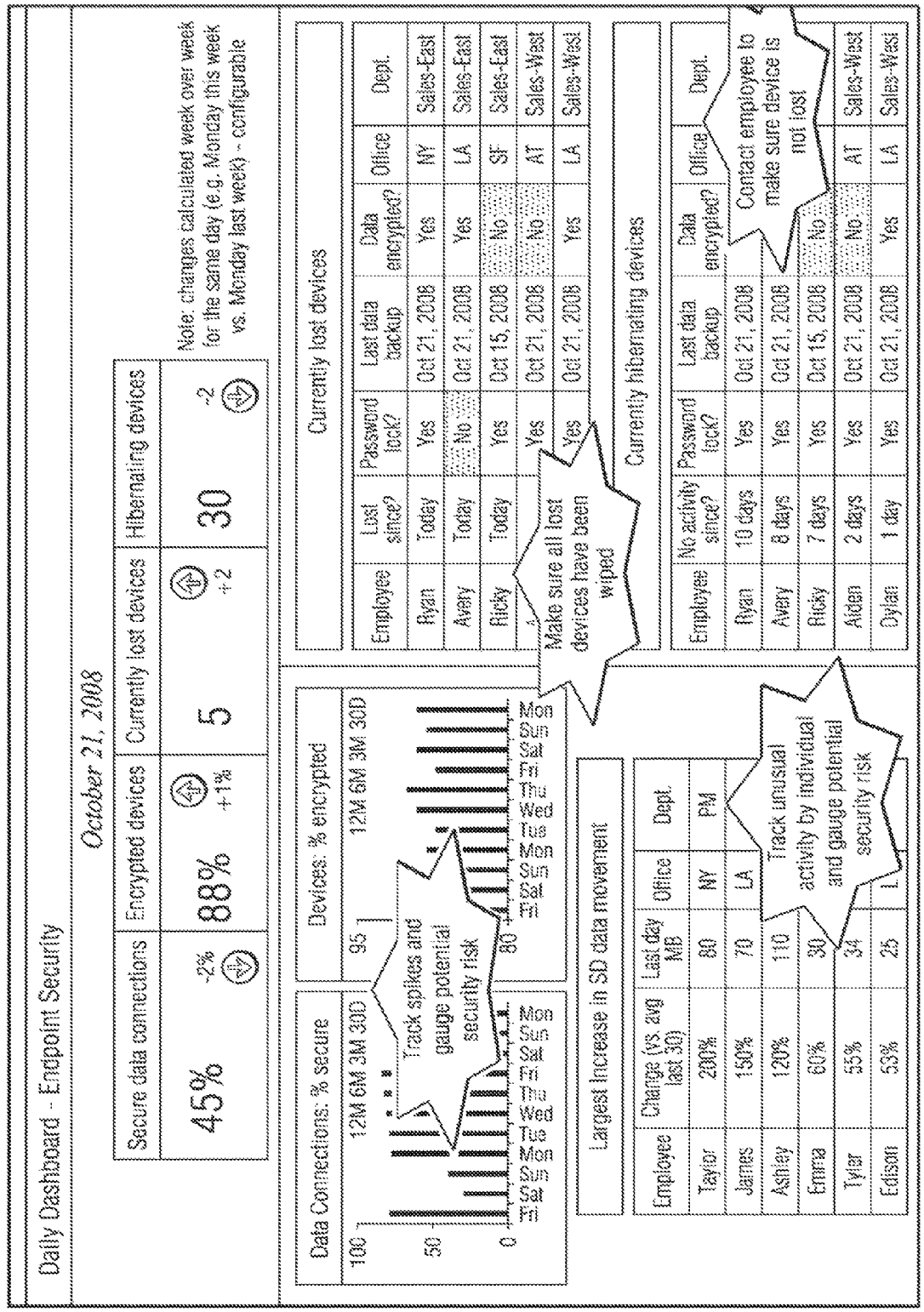
Figure 9D:
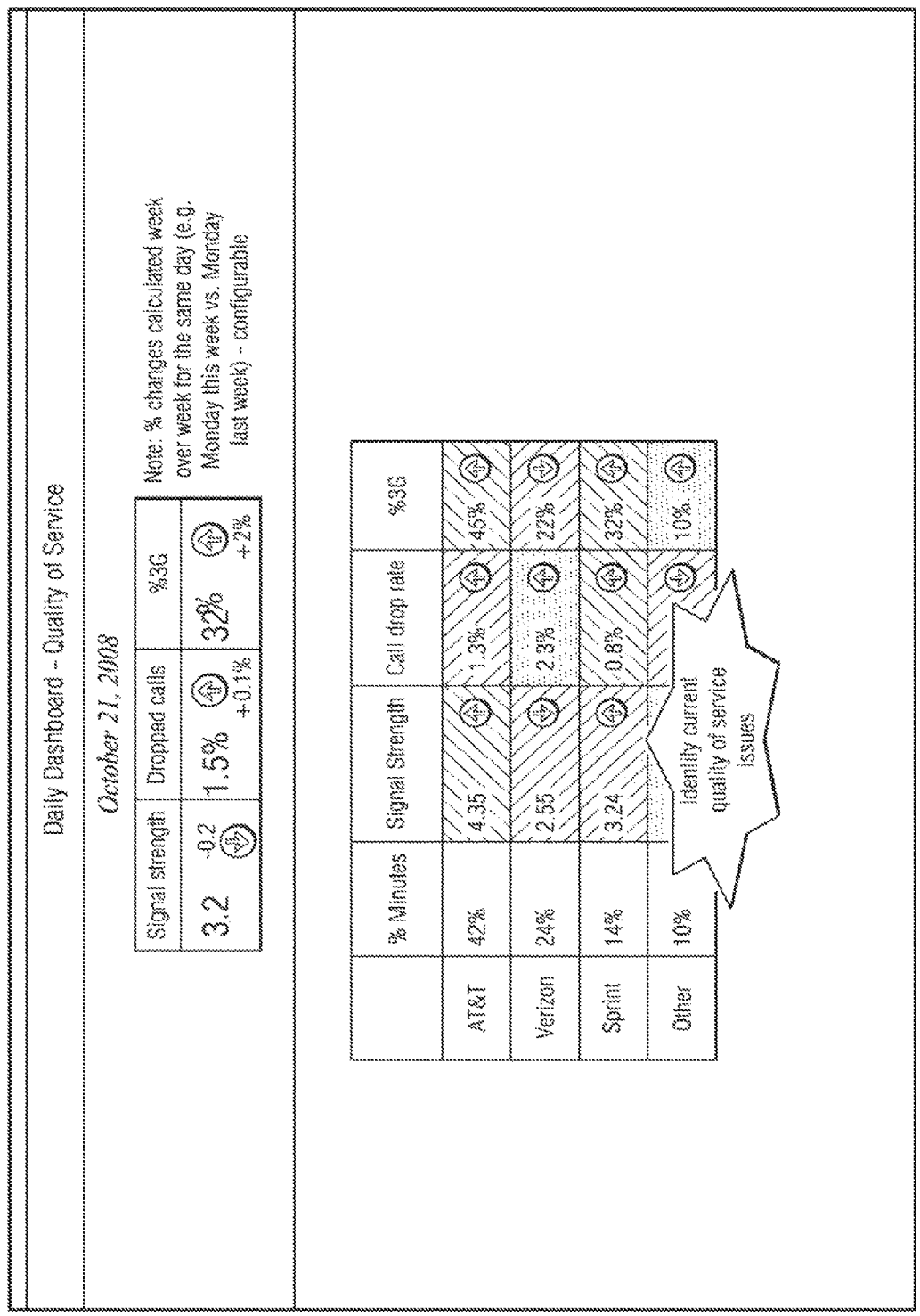
Figure 10A:
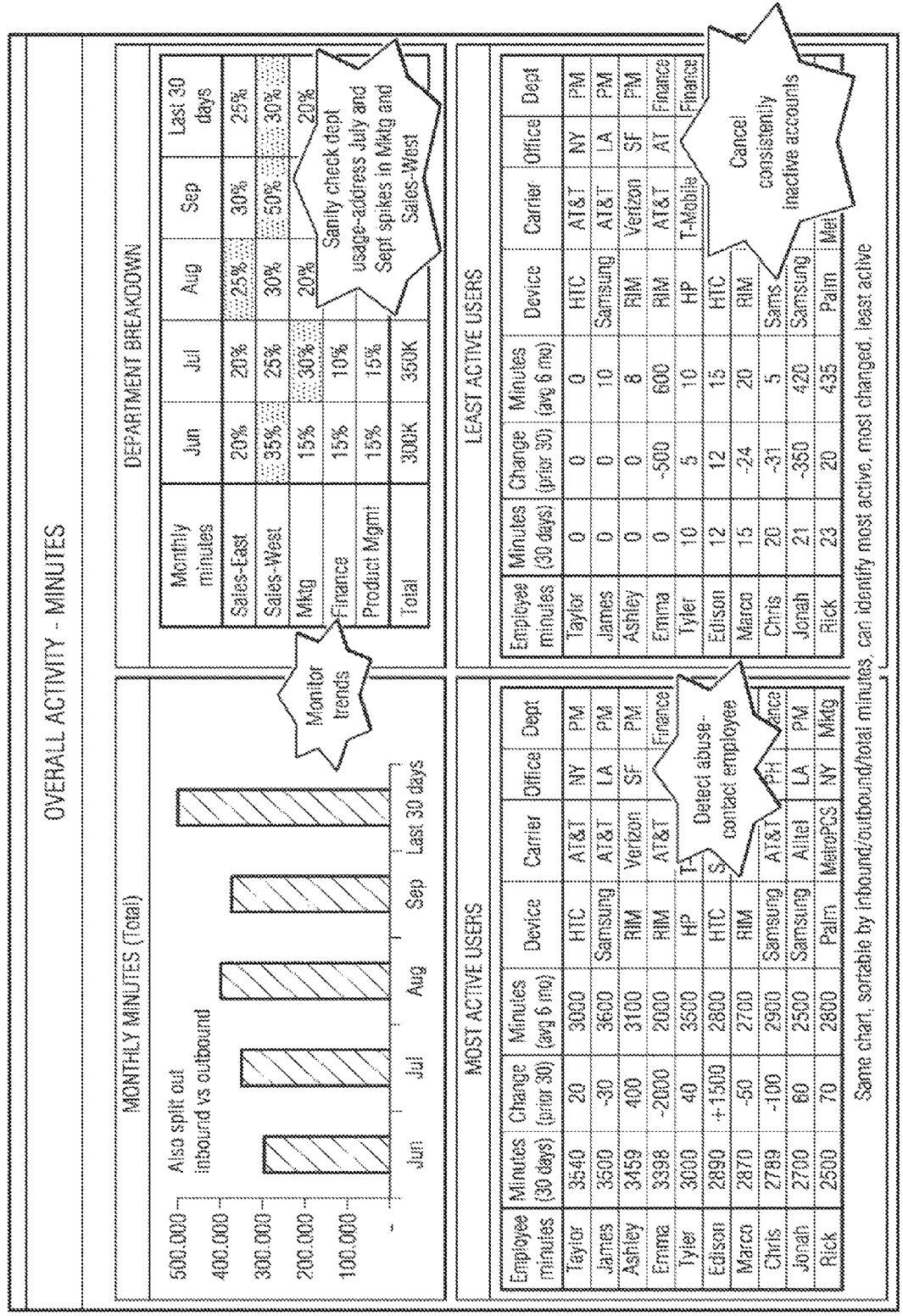
FIGS. 10A-10C illustrate example voice, data, and SMS usage reports, respectively.
Figure 10B:
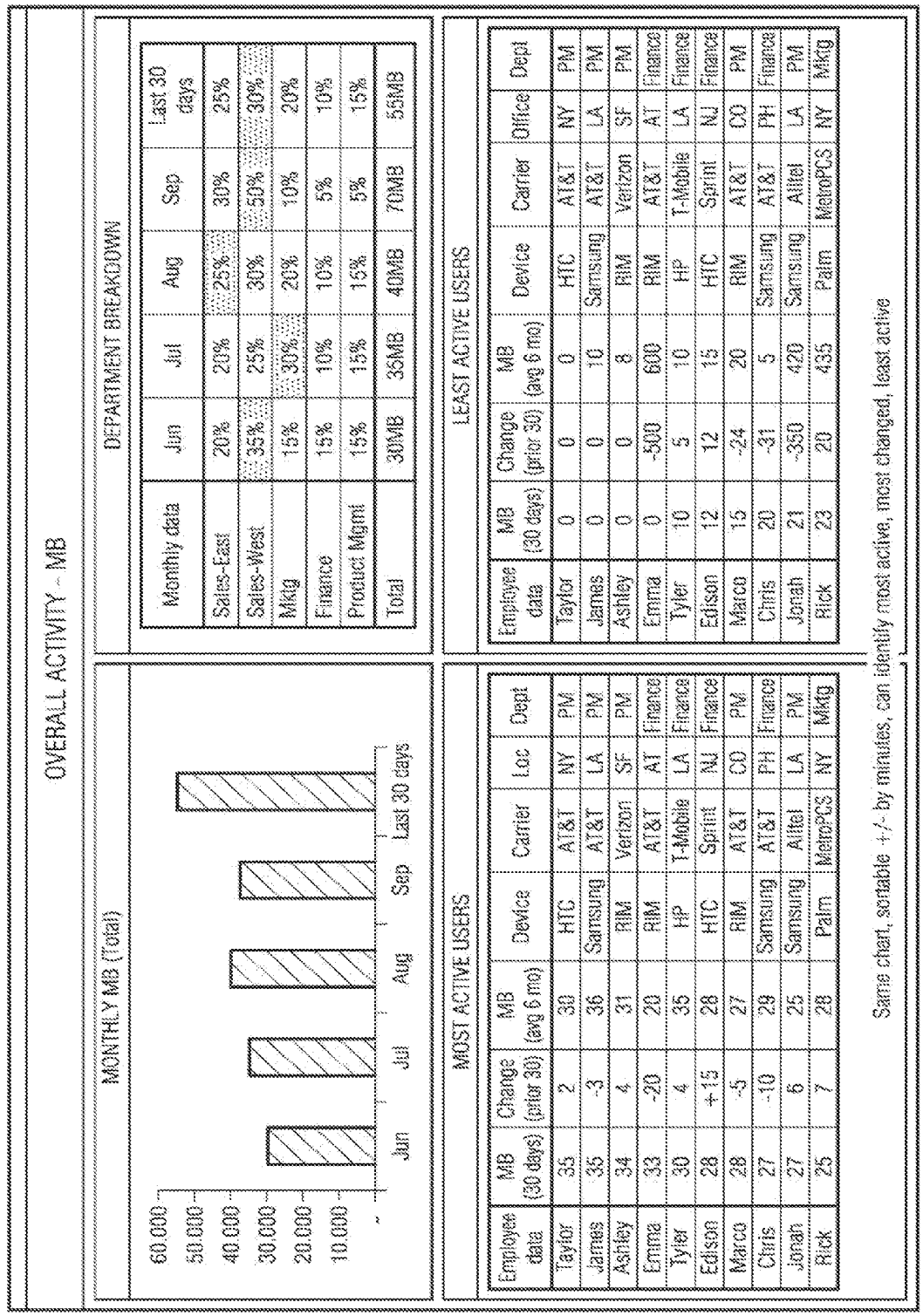
Figure 10C:
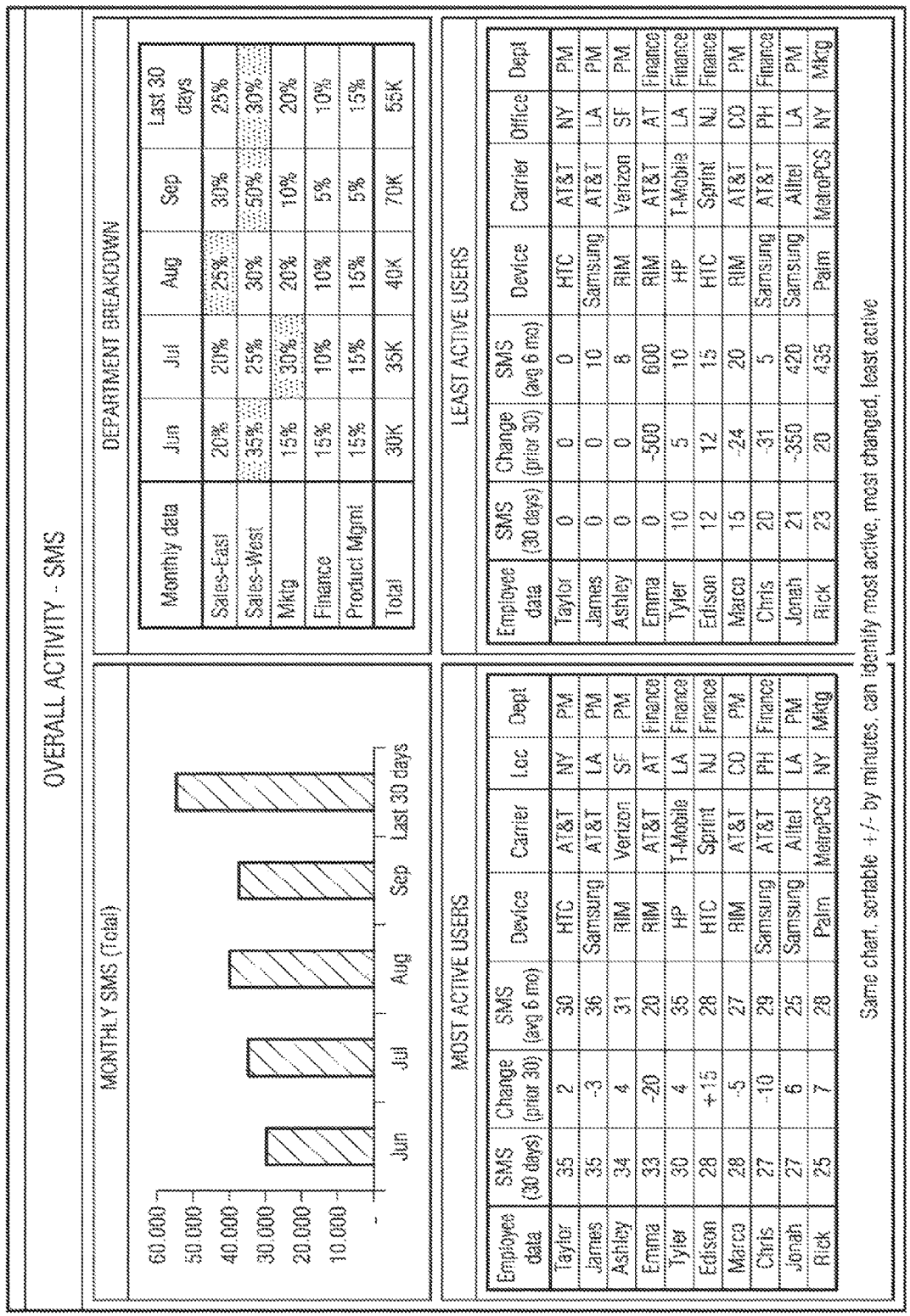
Figure 11A:
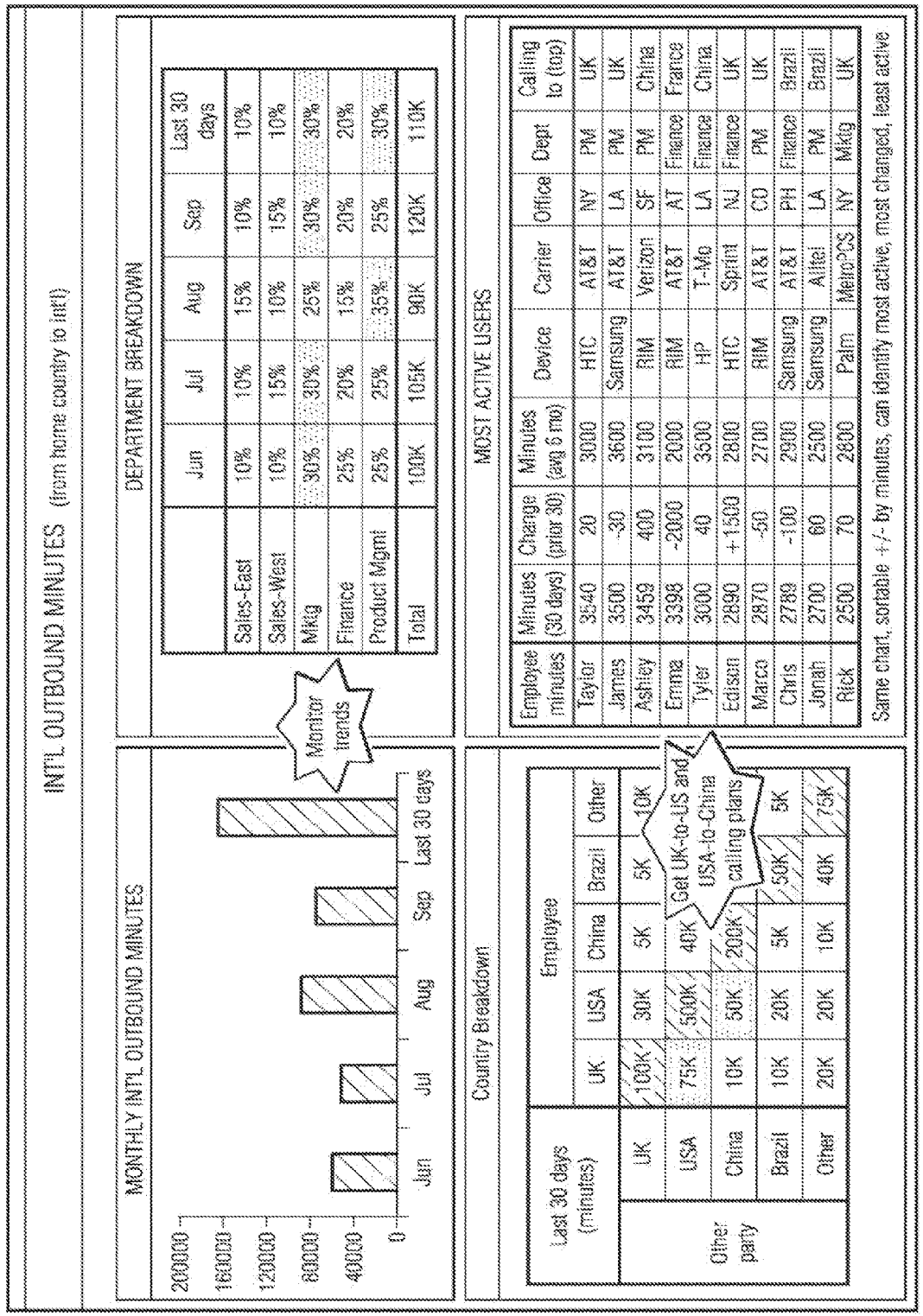
Figure 11B:
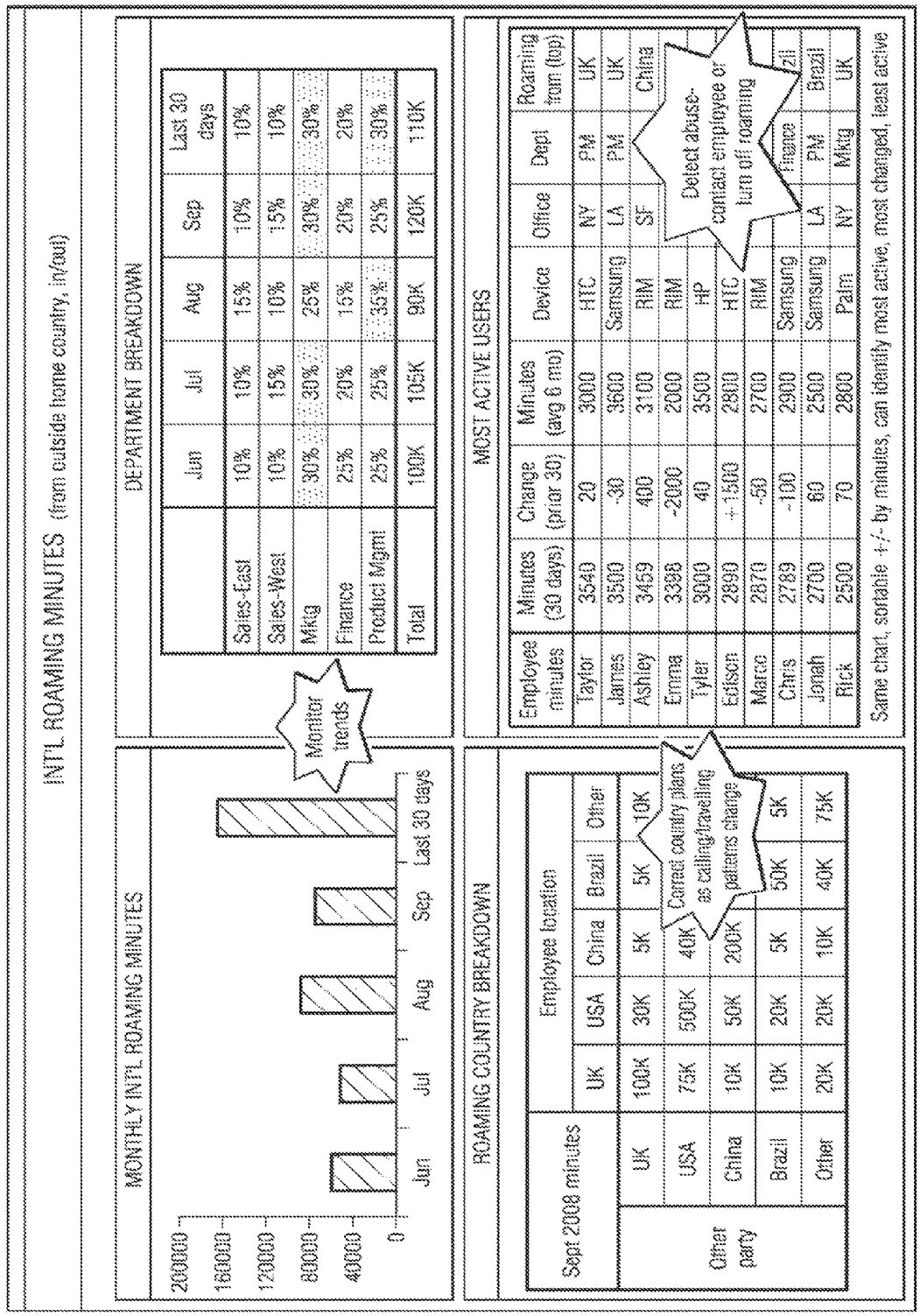
Figure 11C:
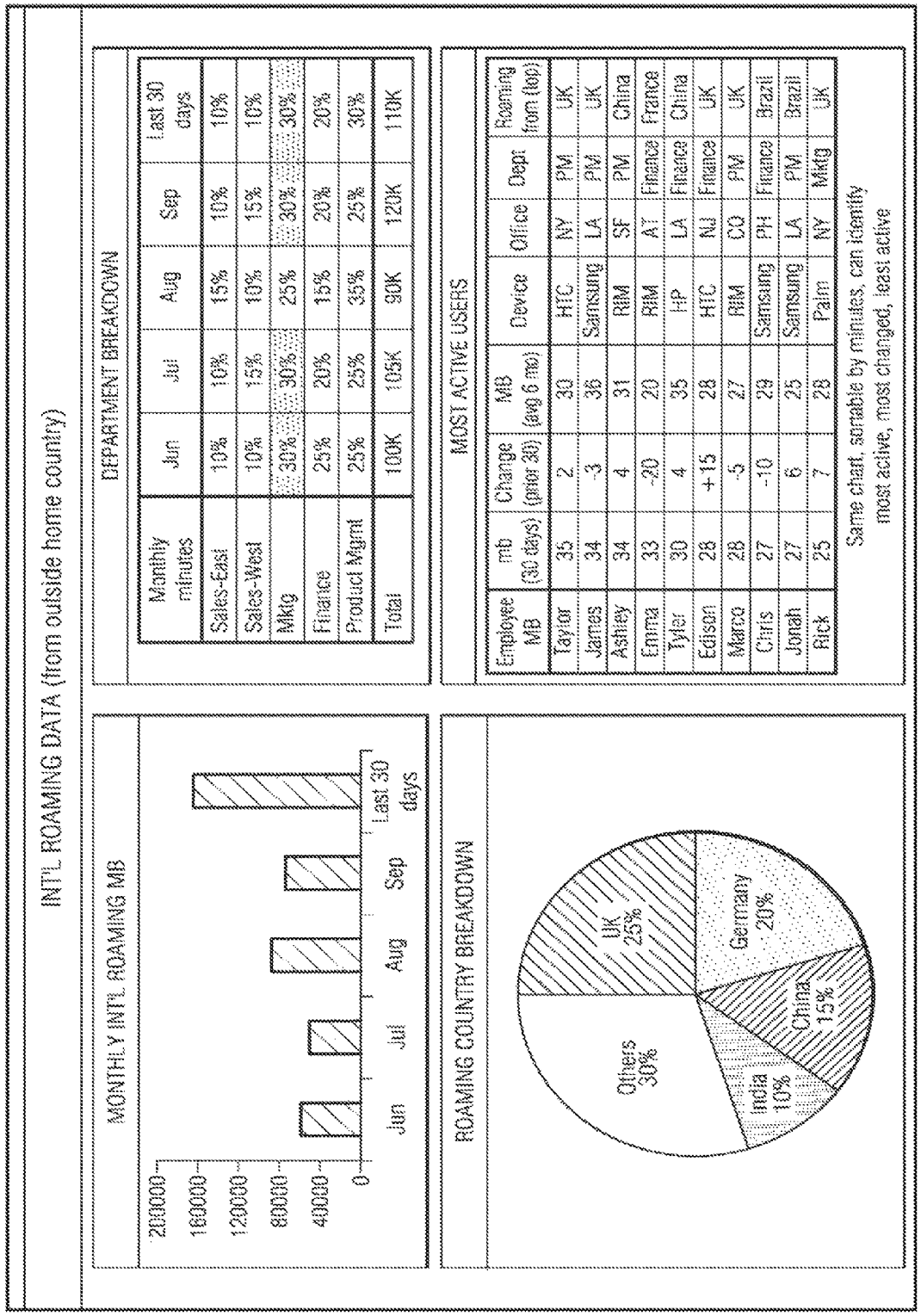
Figure 12A:
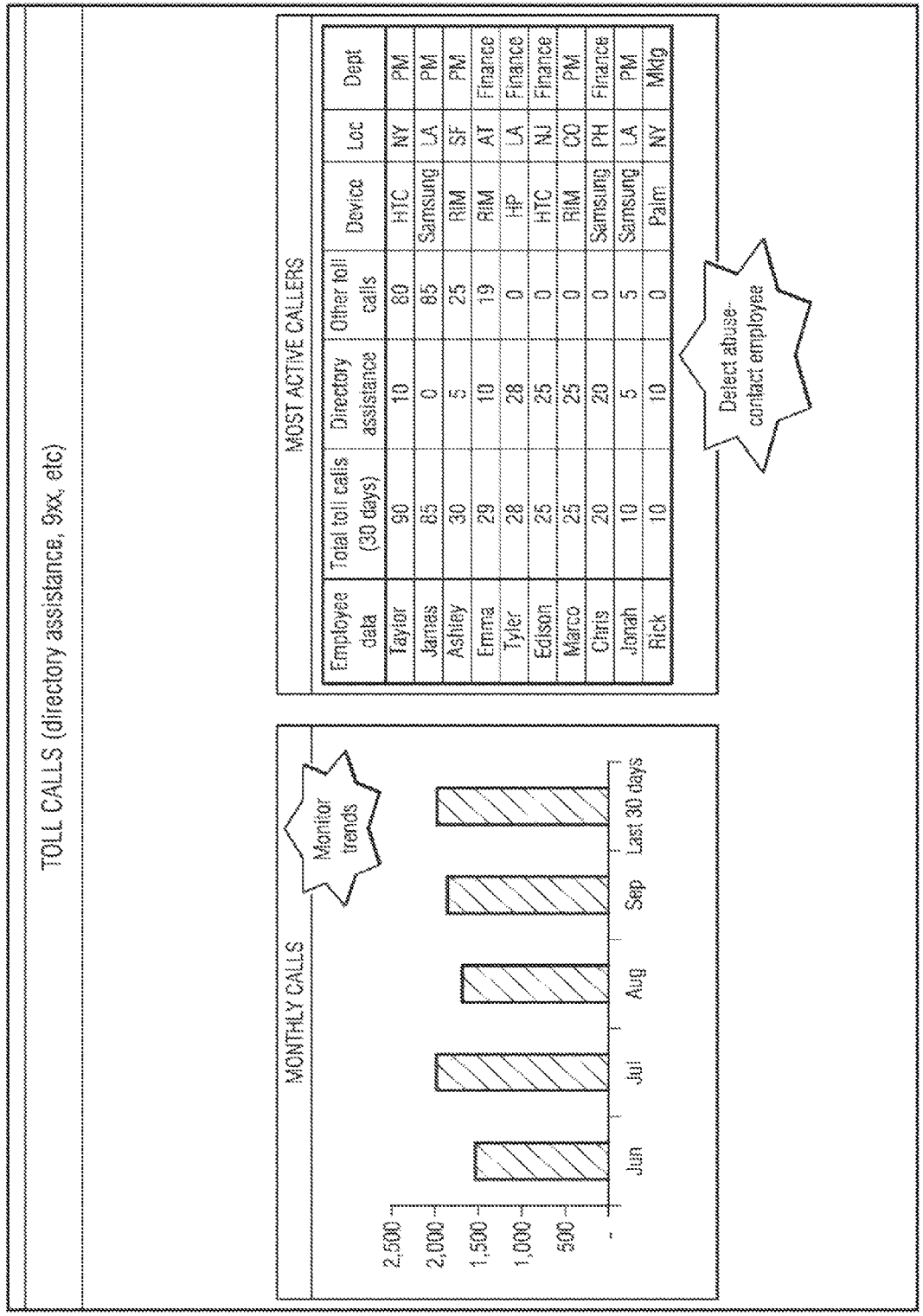
FIGS. 12A-12H illustrate various other example reports.
Figure 12B:
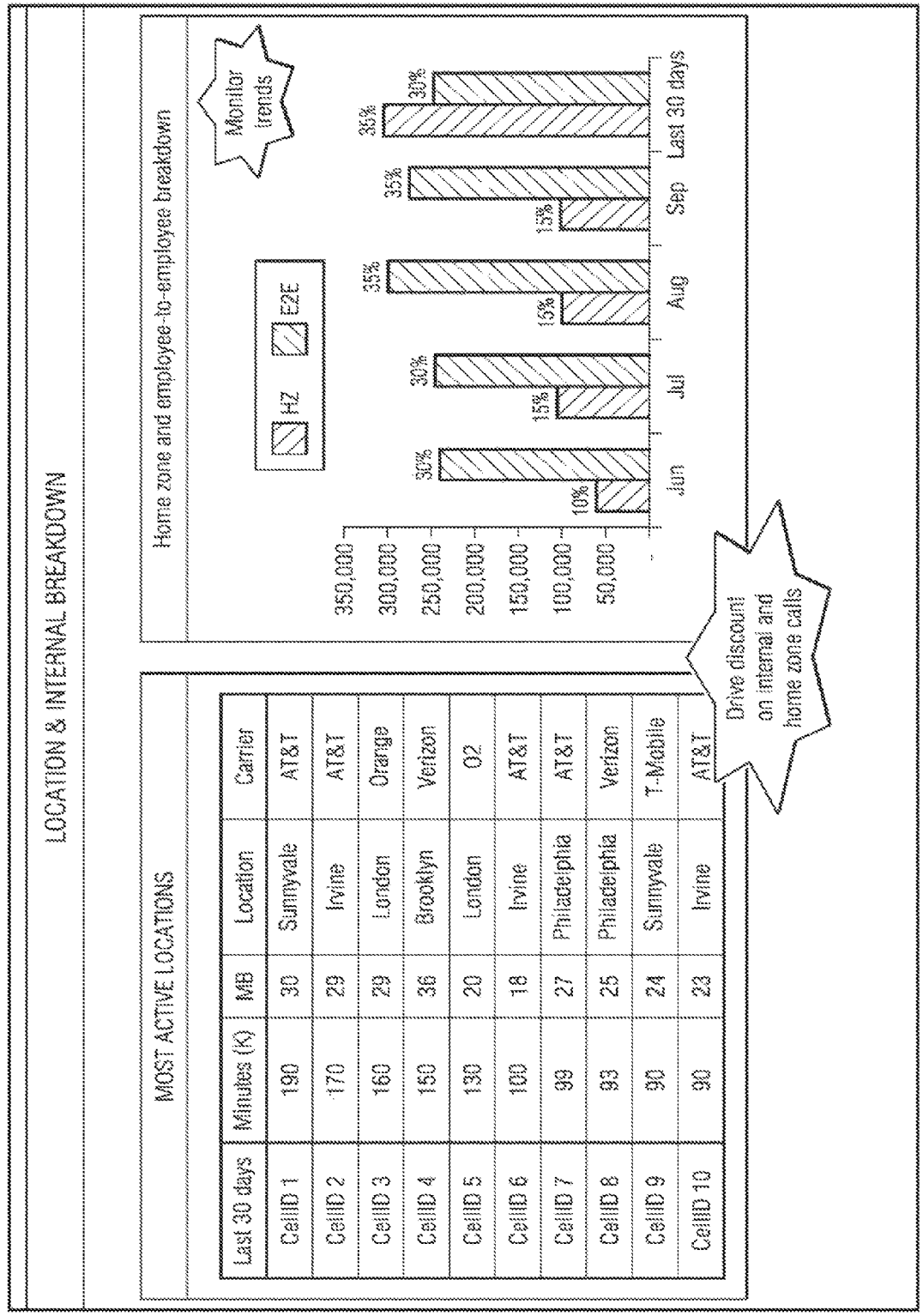
Figure 12C:
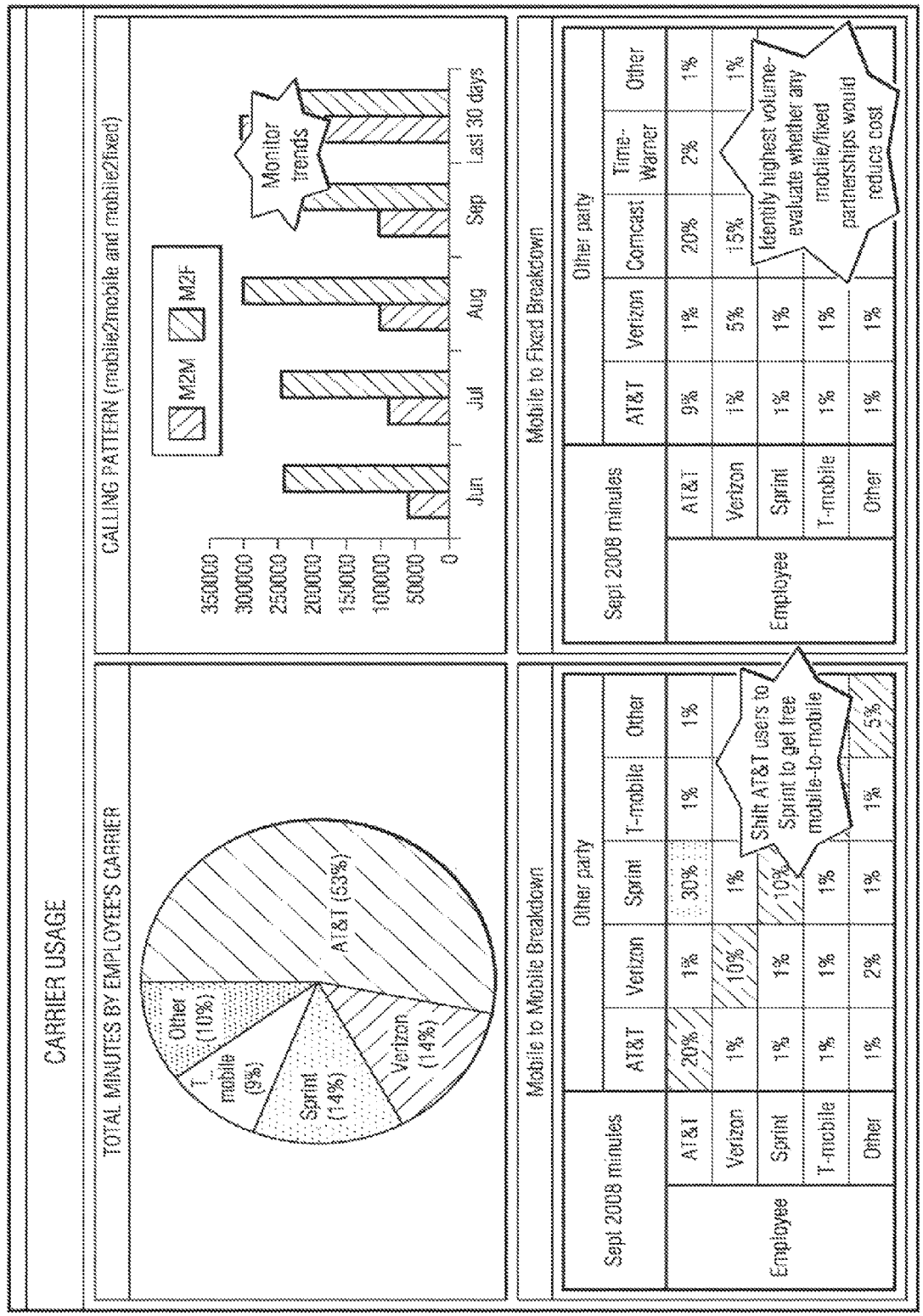
Figure 12D:
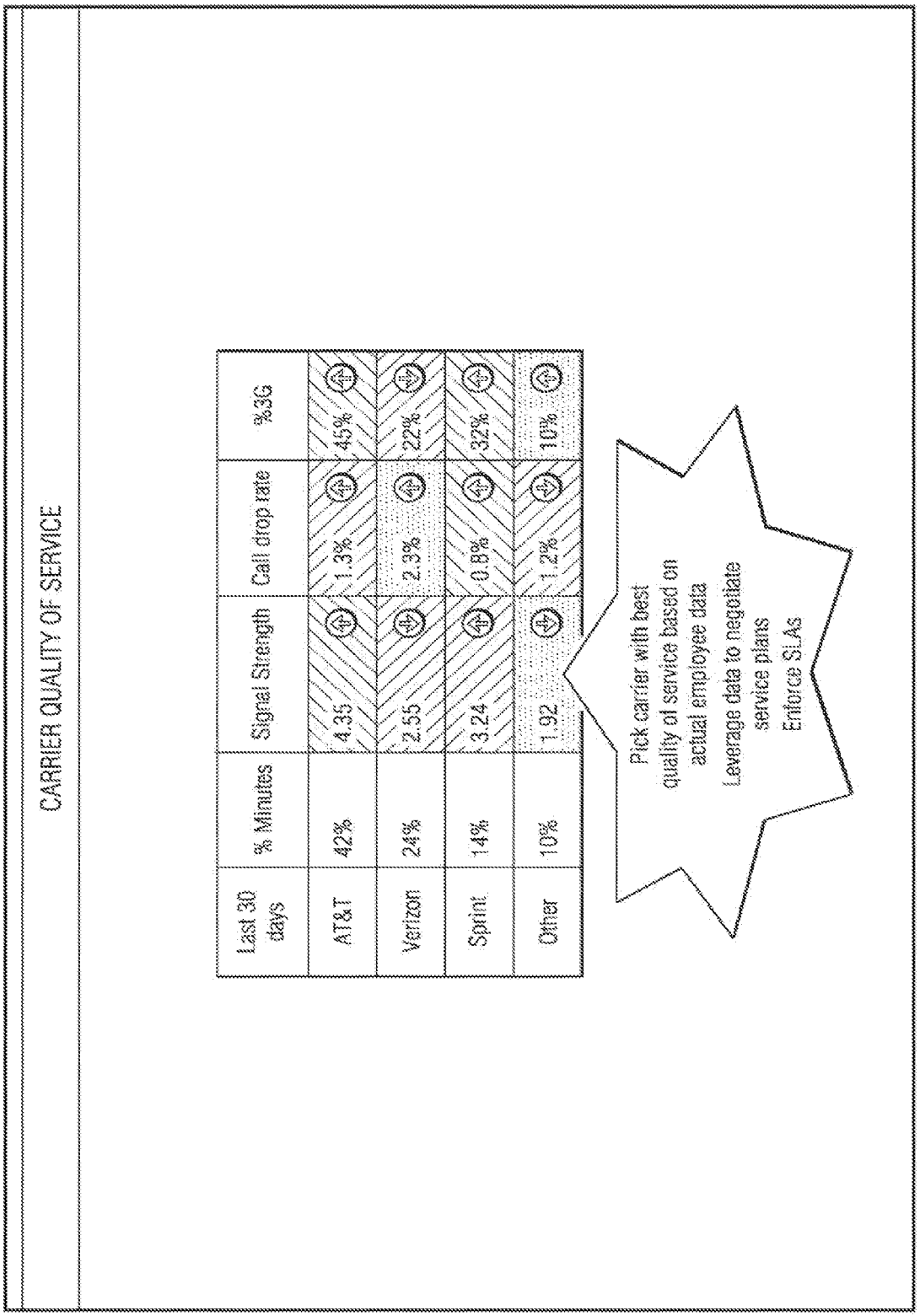
Figure 12E:
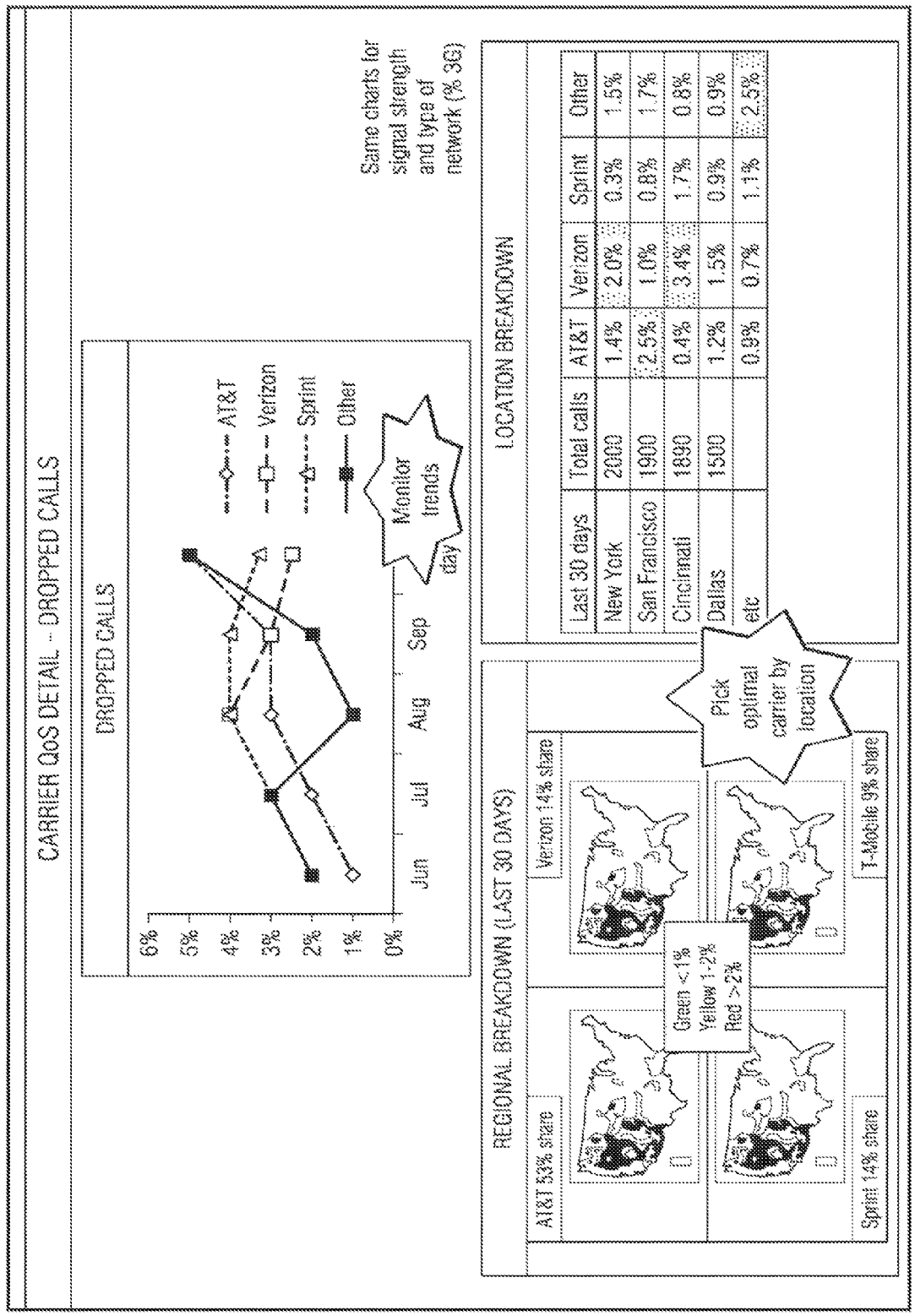
Figure 12F:
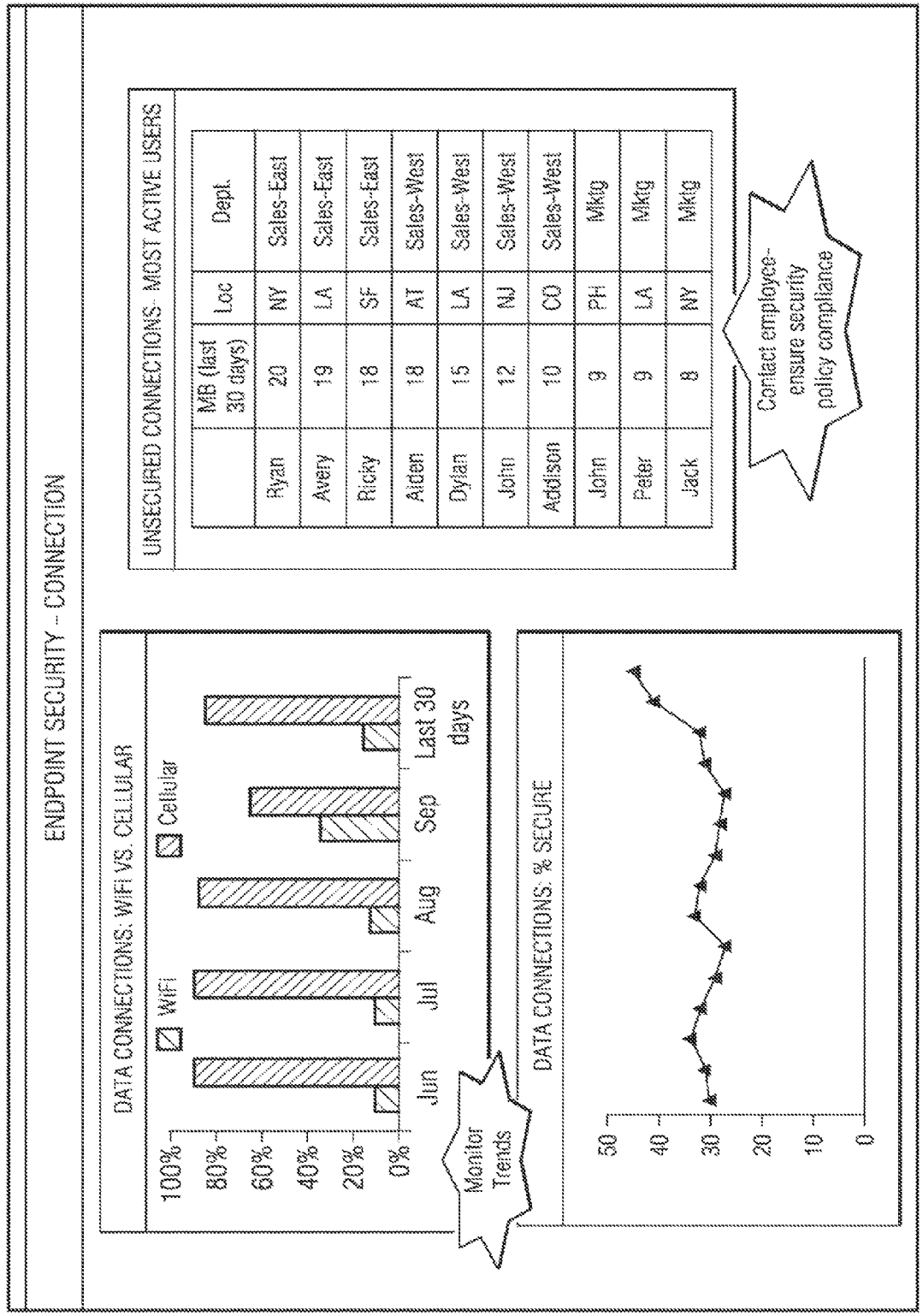
Figure 12G:
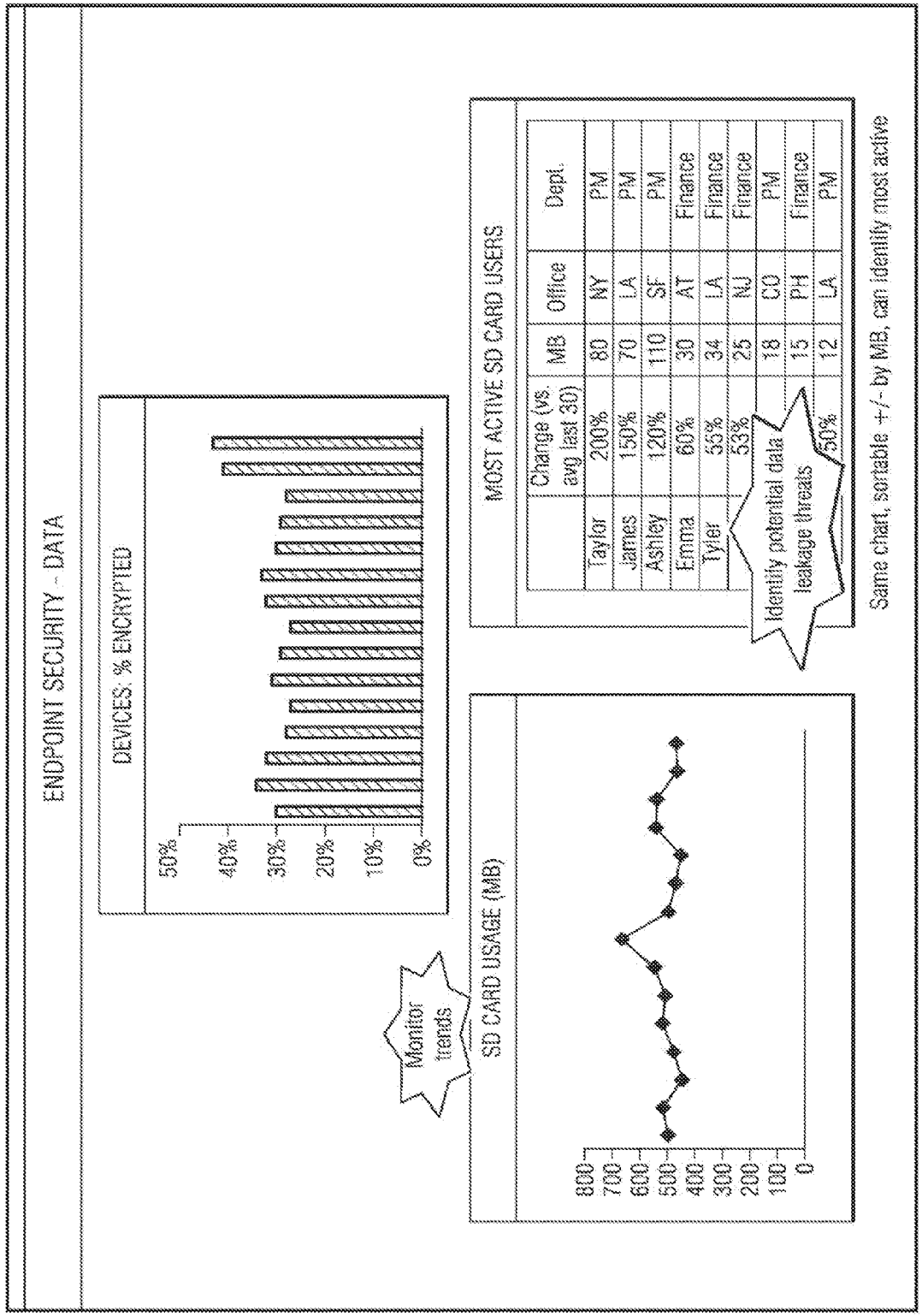
Figure 12H:
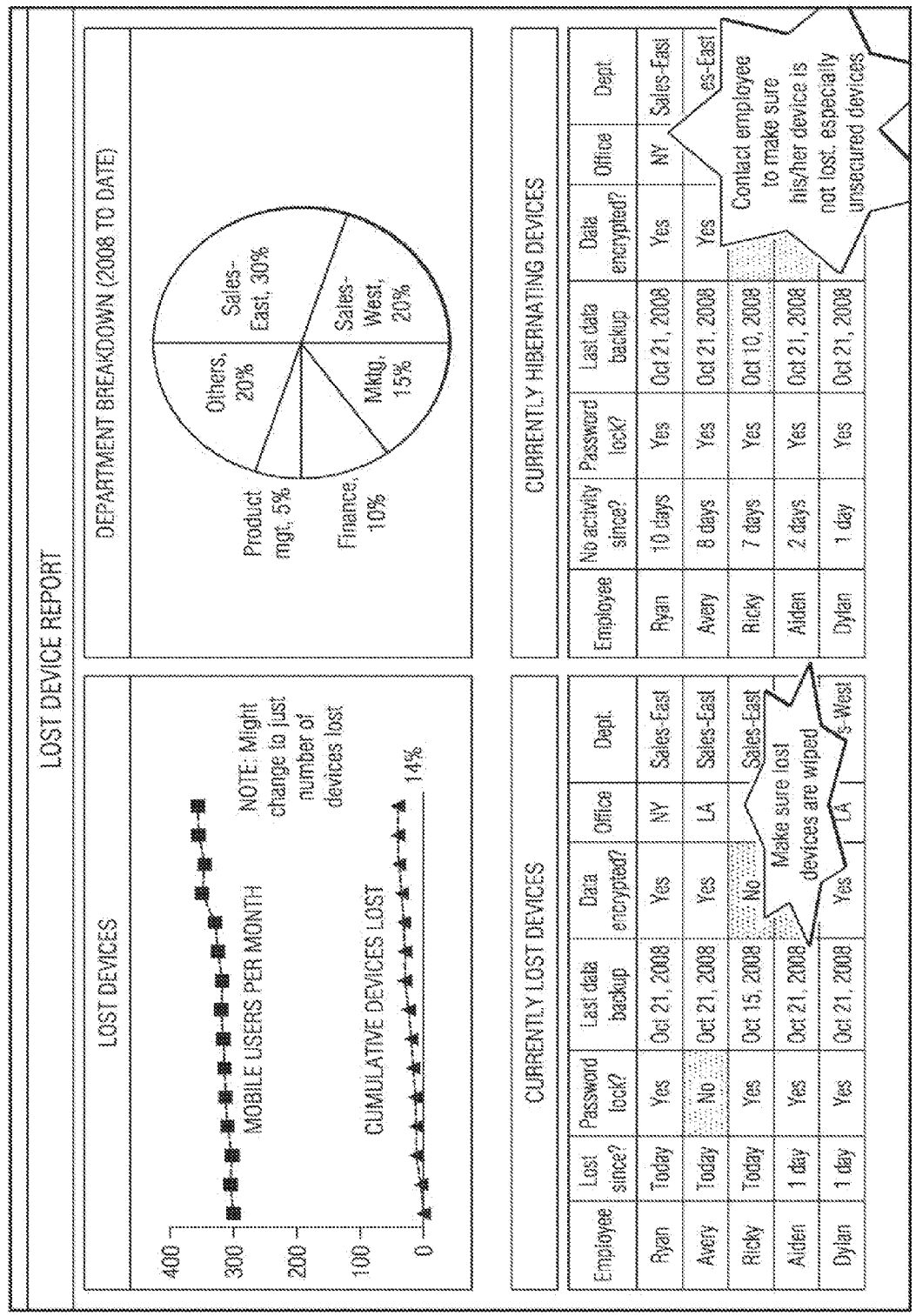

The MAI reports may be electronically sent to and presented though a graphical user interface to a mobile device manager such as, for example, an enterprise manager at the enterprise. By way of example, FIGS. 9A and 9B illustrate example "Dashboard" usage reports while FIGS. 9C and 9D illustrate example Dashboard security and QoS reports, respectively. In particular embodiments, separate specific usage reports may be generated. In some embodiments, specific usage reports may include call (voice) summary reports, data summary reports, and SMS summary reports. By way of example, FIGS. 10A-10C illustrate example "Overall Activity" minutes, data quantity (e.g., Mb), and SMS reports. For enterprises having significant numbers of international mobile users, reports specifically related to international usage may be desirable. FIGS. 11A-11D illustrate example international outbound minutes, roaming minutes, and roaming data reports, and current roamers, respectively. Other desirable reports include, by way of example, toll calls (e.g., pay calls such as 411 directory service or 900 numbers) reports, location and international breakdown reports, carrier usage summary reports, carrier QoS reports, carrier dropped calls reports, connection security reports, data security reports, and lost device reports, didactic examples of which are illustrated in FIGS. 12A-12H, respectively. Still other reports may include mobile versus fixed recipient reports (e.g., calls made to other mobile phones versus calls made to fixed wired phones), employee to employee reports, carrier to carrier reports (e.g., the number of calls made from AT&T serviced mobile phones to other AT&T serviced phones or the number of calls made from Verizon serviced phones to T-Mobile serviced phones), or home zone/cellular tower activity reports, phone type breakdown reports, as well as signal strength, SNR and network speed reports (e.g., by carrier, location and over time), among others.

Home zone and/or cellular tower activity reports in particular may be useful for a number of enterprises. A home zone generally refers to the geographic area from which an enterprise or enterprise office is associated. The home zone is generally served by a specific cellular tower. Mobile phone usage data includes information that may be used to uniquely identify the cellular tower used for particular calls or other usage. An example cellular tower activity report may include a list of cellular tower used in servicing the mobile devices of the enterprise. These towers may be ranked in order of most used to least used and, in particular embodiments, may include the number of minutes served by each particular tower. Still further, a cellular tower activity report may provide information regarding which users are currently being served by a given tower.

Based on the gathered cellular tower information, the MAI server may determine which cellular tower is associated with the enterprise and furthermore, what percentage of calls or data transmissions are being made between mobile phones associated with the home zone cellular tower or within the home zone in general (i.e., a mobile phone within the home zone calls a fixed wired phone in the home zone). If this percentage is high, it may indicate to the enterprise that the enterprise should consider finding alternative ways to route calls between phones that are both located within the home zone. By way of example, the enterprise may determine that using a voice over internet protocol (VoIP) service to deliver voice communications between mobile devices in the home zone is more cost effective than using a cellular network.

Figure 13:
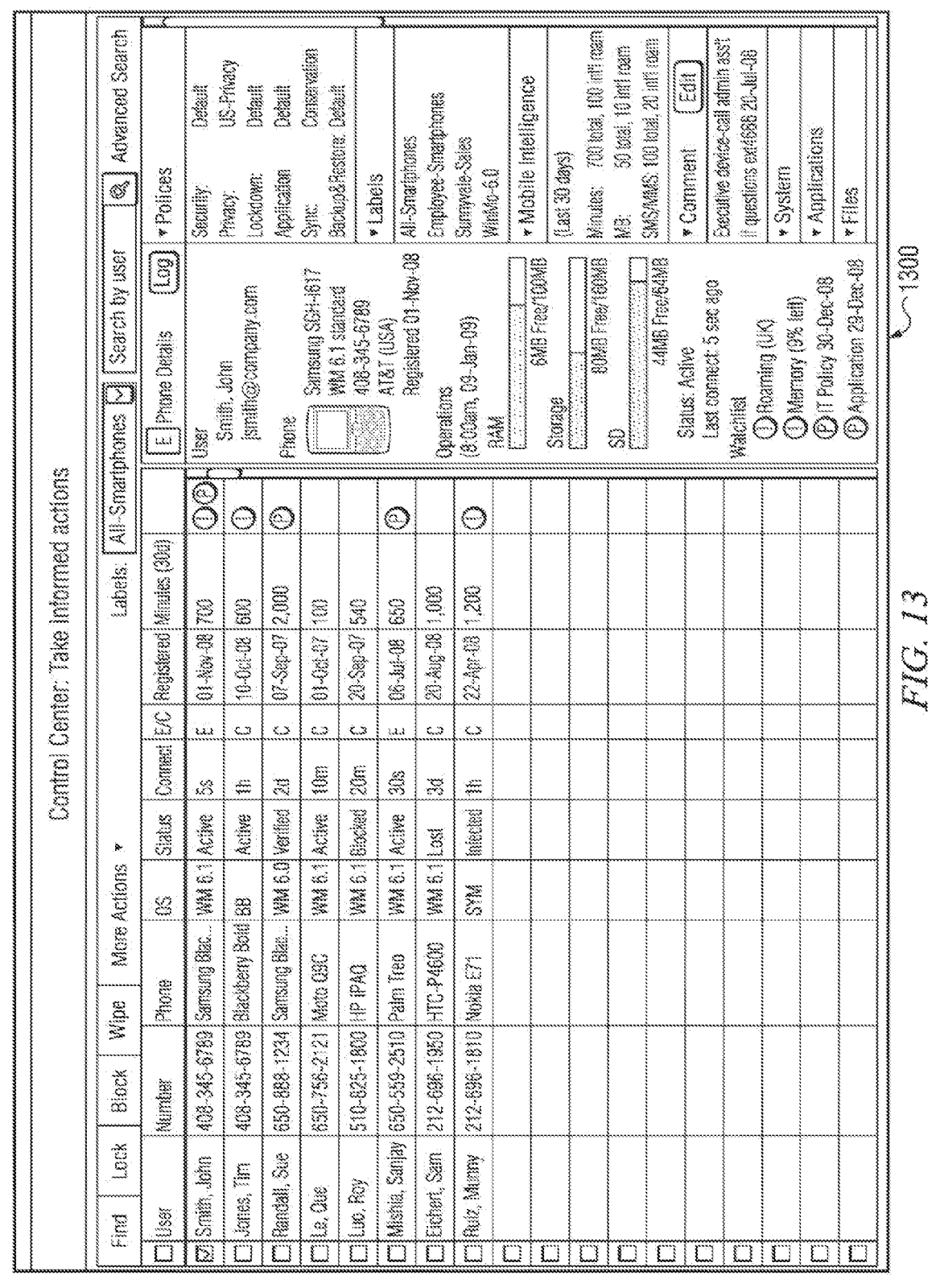

Furthermore, FIG. 13 illustrates an example control center interface 1300 for use in taking informed actions with respect to individual users. The interface shown in FIG. 13 shows particular users and their associated mobile devices and allows a manager to take actions with respective to particular users and their associated mobile devices. By way of example, the control center may allow a manager to locate a particular mobile device, view a particular mobile device's usage, place a particular mobile device on a watchlist, block service for a particular mobile device, send an alert to a particular mobile device, wipe portions of the memory of a particular mobile device, set privacy and security policies for a particular mobile device, among other actions.

It should be noted that all of the above example reports and names used in the reports are for didactic purposes and the data and other information in these didactic reports should not be construed as accurate or in any way representative of specific companies or network carriers whose names appear in the reports.

In particular embodiments, the above data and reports may be integrated/aggregated with the bills from an enterprise's network service provider(s). In a particular embodiment, this may enable automatic bill auditing and/or plan optimization.

In an additional embodiment, the data aggregated from a particular enterprise may be stripped of most or all individual and/or enterprise identifying data (e.g., names, phone numbers, IP addresses, end points, etc.) such that the data is not traceable back to a specific individual or even a particular enterprise. The data may then be further aggregated with anonymized data collected from other enterprises in a central data repository. In this way, the central MAI service provider may provide multi-enterprise reports that include aggregated data from a plurality of enterprises and provide valuable insight to each of the enterprises (and others). As outlined above, such reports may provide feedback on particular phones and carriers (including carrier market share) among other useful information. Such feedback may be useful in determining which phone(s) to buy and which carriers and service plans to use. More generally, such multi-enterprise data may be presented in the form of a consolidated quality of service (QoS) map across all enterprise customers for each specific network service provider or for a combination of two or more network service providers. The consolidated multi-enterprise QoS map may include dropped call percentage, signal strength, whether the network supports 2G or 3G at particular locations, percentage 3G, network speed, among other information (such as that provided in the individual enterprise reports).

Figure 14A:
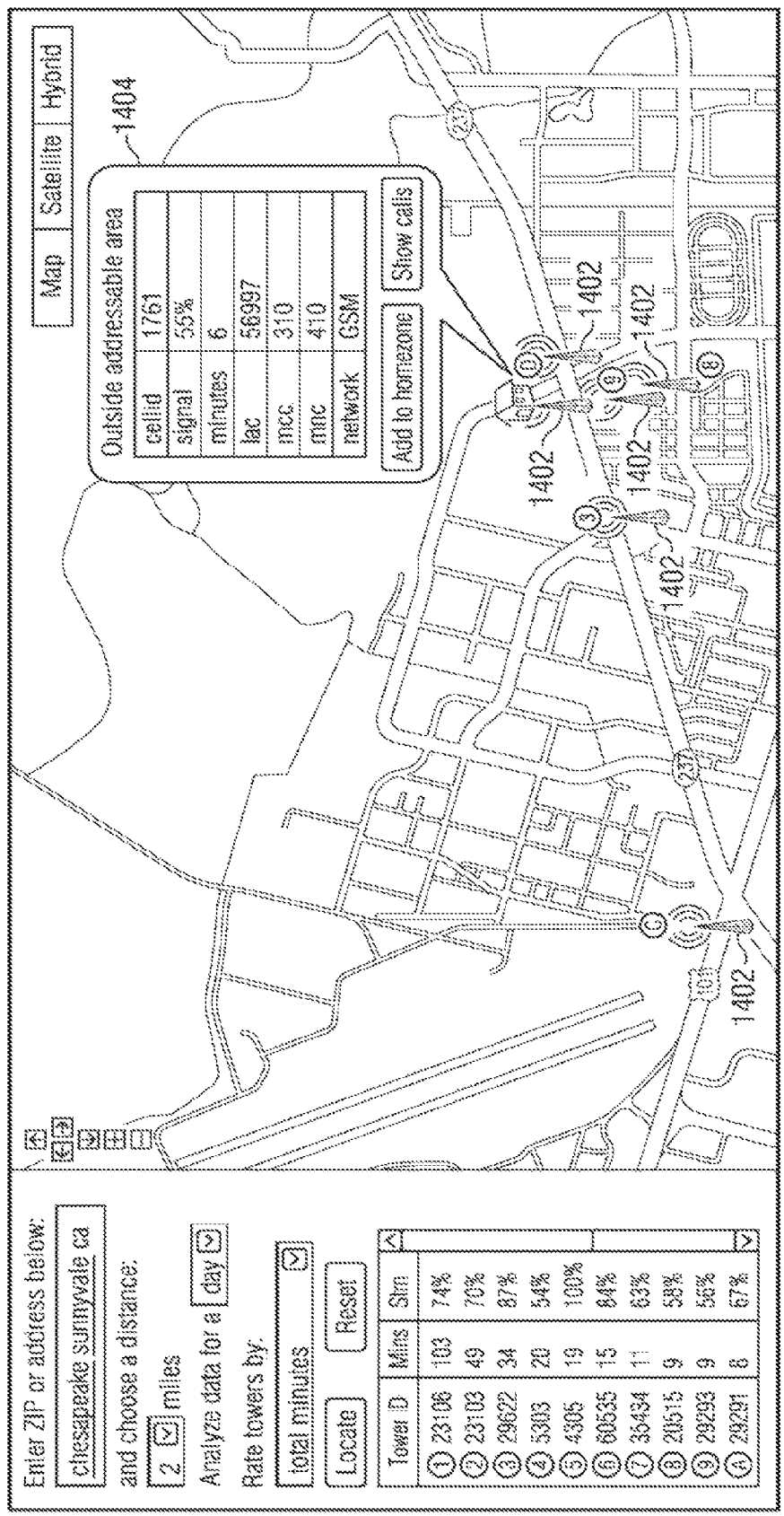
FIGS. 14A and 14B illustrate example QOS maps.
Figure 14B:
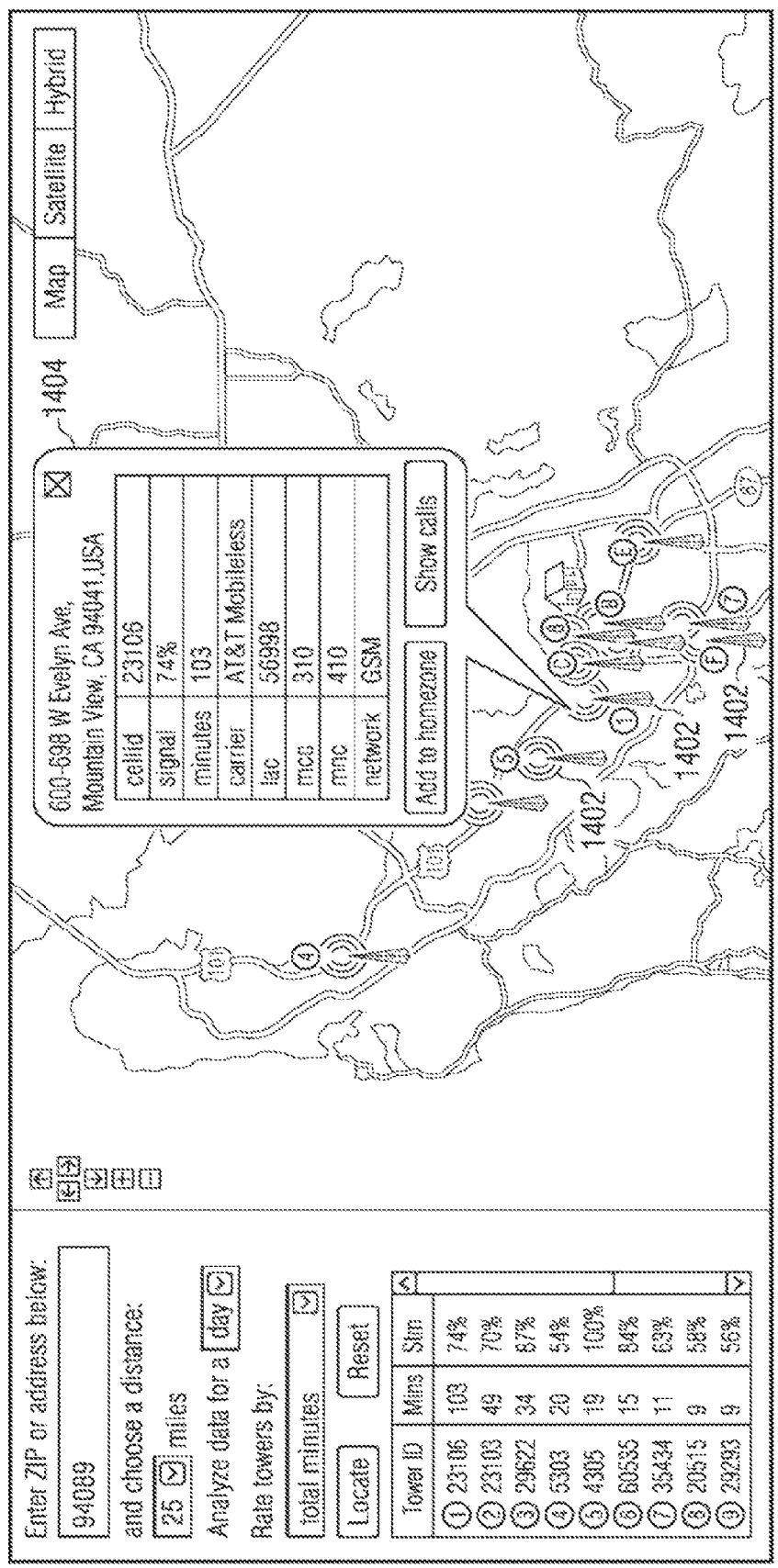

FIGS. 14A and 14B illustrate example interactive QOS maps with cellular tower locations. A user may choose a specific cellular tower 1402 (e.g., by clicking with a mouse or rolling the a cursor over the tower) and, subsequently, the user is presented with a pop-up window 1404. Window 1404 may provide the cell ID of the tower, signal strength of the tower, individual, enterprise or total minutes serviced by the particular tower during a particular period of time, the type of network the tower supports, among other information. Alternately or additionally, a user may be presented with "heat" maps that show, for example, signal strength or network speed as a function of color with respective to a desired geographic location or one or more cellular tower locations. FIG. 14C shows an example pop-up window 1406 showing call logs for a particular cellular tower.

Figure 15:
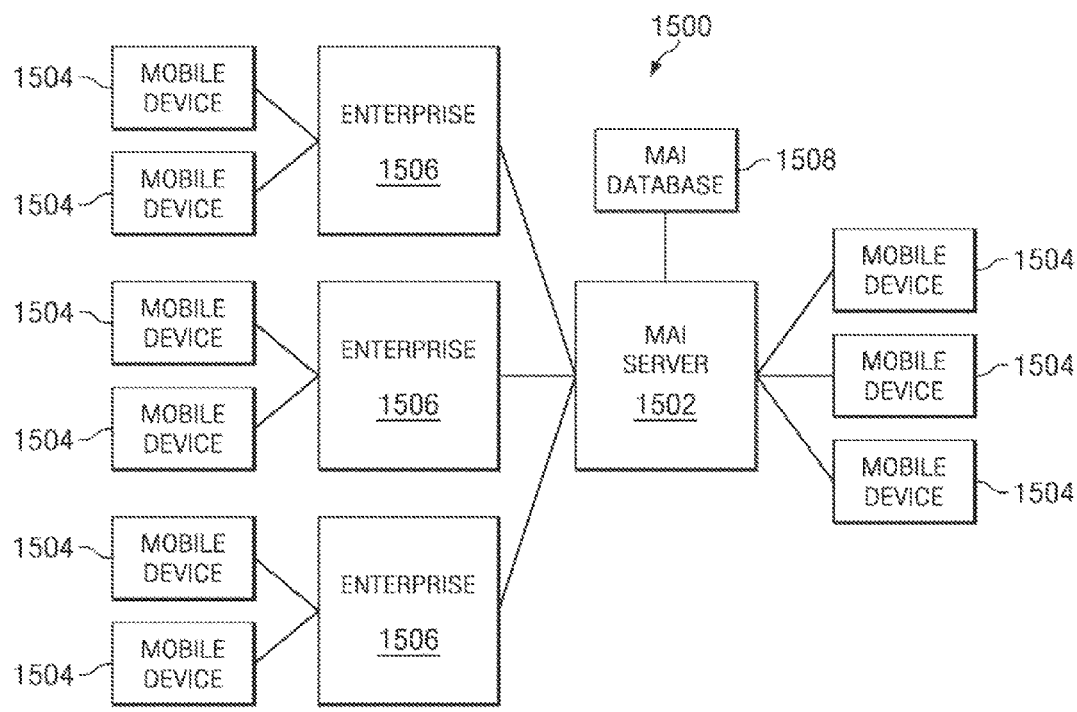
FIG. 15 illustrates an example embodiment of a central mobile activity intelligence service provider system.

FIG. 15 illustrates an example embodiment of a central MAI service provider system 1500. As illustrated in FIG. 15, central system 1500 includes a central MAI server 1502. By way of example, central MAI server 1502 may include HTTP and related functionality. Central MAI server may receive input from a variety mobile devices 1504 directly or, in alternate embodiments, from a plurality of enterprises 1506 that, in turn, receive data directly from mobile devices associated with the enterprises. Central MAI server 1502 may store this and other data in memory within a central MAI database 1508. As described above, central MAI server 1502 is configured to aggregate the mobile device data across enterprises and carriers and make it accessible to users of the various enterprises. By way of example, MAI server may include functionality that provides carrier comparison and other reports to decision makers at enterprises to evaluate carriers among other concerns. To facilitate this, central MAI server 1502 may be coupled to a plurality of enterprise management appliances 1510, each enterprise management appliance being located or associated with a particular enterprise. In a particular embodiment, an enterprise management appliance 1520 may be configured to present a graphical user interface (GUI) to a manager or decision maker at the enterprise. By way of example, the GUI may display reports generated by central MAI server 1502. The GUI may also give a manager the ability to request reports or to modify or customize existing or create new reports. As another example, the GUI may allow a manager to control aspects of various mobile devices associated with the enterprise (e.g., enable/disable the mobile devices, send alerts, etc.)

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, at a first server, from each of a plurality of mobile devices associated with a particular enterprise, mobile device usage data including for each of at least a subset of the plurality of mobile devices usage data each of one or more instances of which has been correlated with a corresponding mobile device context data, wherein a first subset of the plurality of mobile devices are associated with a first network service provider and a second subset of the plurality of mobile devices are associated with a second network service provider;
aggregating the usage data from each of the plurality of mobile devices; and
generating one or more mobile device usage reports based on the aggregated usage data, including by using said mobile device context data to generate a summary of at least a portion of the aggregated usage data broken out by a context indicated by said mobile device context data.

2. The method of claim 1, wherein each of said at least a subset of the plurality of mobile devices includes a control client application configured to extract instances of said usage data and correlate each instance of said usage data with a corresponding context data.

3. The method of claim 2, wherein the corresponding context data comprises a timestamp.

4. The method of claim 2, wherein the corresponding context data comprises a geographical location of the mobile device.

5. The method of claim 2, wherein the corresponding context data comprises a cellular tower or other physical communication network component with which the instance of said usage data is associated.

6. The method of claim 2, wherein the control client application is configured to filter said usage data at the mobile device based on one or more policies.

7. The method of claim 2, wherein the first server is configured to poll the control client application to prompt the client control application to do one or both of to gather and to report said usage data.

8. The method of claim 7, wherein the first server is configured to poll the control client application periodically.

9. The method of claim 7, wherein the first server is configured to poll the control client application in response to an event received at the first server.

10. A mobile device management system, comprising:
a communication interface; and
a processor couple to the communication interface and configured to:
receive via the communication interface, from each of a plurality of mobile devices associated with a particular enterprise, mobile device usage data including for each of at least a subset of the plurality of mobile devices usage data each of one or more instances of which has been correlated with a corresponding mobile device context data, wherein a first subset of the plurality of mobile devices are associated with a first network service provider and a second subset of the plurality of mobile devices are associated with a second network service provider;
aggregate the usage data from each of the plurality of mobile devices; and
generate one or more mobile device usage reports based on the aggregated usage data, including by using said mobile device context data to generate a summary of at least a portion of the aggregated usage data broken out by a context indicated by said mobile device context data.

11. The system of claim 10, wherein each of said at least a subset of the plurality of mobile devices includes a control client application configured to extract instances of said usage data and correlate each instance of said usage data with a corresponding context data.

12. The system of claim 11, wherein the corresponding context data comprises a timestamp.

13. The system of claim 11, wherein the corresponding context data comprises a geographical location of the mobile device.

14. The system of claim 11, wherein the corresponding context data comprises a cellular tower or other physical communication network component with which the instance of said usage data is associated.

15. The system of claim 11, wherein the control client application is configured to filter said usage data at the mobile device based on one or more policies.

16. The system of claim 11, wherein the processor is configured to poll the control client application to prompt the client control application to do one or both of to gather and to report said usage data.

17. The system of claim 16, wherein the processor is configured to poll the control client application periodically.

18. The system of claim 16, wherein the processor is configured to poll the control client application in response to an event received at the first server.

19. A computer program product embodied in a non-transitory computer readable storage medium and comprising computer instructions for:
receiving, at a first server, from each of a plurality of mobile devices associated with a particular enterprise, mobile device usage data including for each of at least a subset of the plurality of mobile devices usage data each of one or more instances of which has been correlated with a corresponding mobile device context data, wherein a first subset of the plurality of mobile devices are associated with a first network service provider and a second subset of the plurality of mobile devices are associated with a second network service provider;
aggregating the usage data from each of the plurality of mobile devices; and
generating one or more mobile device usage reports based on the aggregated usage data, including by using said mobile device context data to generate a summary of at least a portion of the aggregated usage data broken out by a context indicated by said mobile device context data.

20. The computer program product of claim 19, wherein each of said at least a subset of the plurality of mobile devices includes a control client application configured to extract instances of said usage data and correlate each instance of said usage data with a corresponding context data.

* * * * *